US006826499B2

(12) United States Patent
Colosky et al.

(10) Patent No.: US 6,826,499 B2
(45) Date of Patent: Nov. 30, 2004

(54) METHOD AND APPARATUS FOR CALIBRATING AND INITIALIZING AN ELECTRONICALLY COMMUTATED MOTOR

(75) Inventors: Mark P. Colosky, Vassar, MI (US); Steven J. Collier-Hallman, Frankenmuth, MI (US); Roy McCann, Saginaw, MI (US); Phillip Weilhammer, Carmel, IN (US); James Charles Tallant, II, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/232,356

(22) Filed: Aug. 30, 2002

(65) Prior Publication Data

US 2003/0076060 A1 Apr. 24, 2003

Related U.S. Application Data

(60) Provisional application No. 60/326,289, filed on Oct. 1, 2001.

(51) Int. Cl.[7] .............................................. H02P 1/18
(52) U.S. Cl. ....................................................... 702/85
(58) Field of Search ................... 702/85, 33; 324/207; 318/254, 561, 601, 207, 569, 609; 341/13; 82/1, 1.11; 451/9; 74/553; 416/61; 701/25; 396/89, 144; 700/71

(56) References Cited

U.S. PATENT DOCUMENTS

| 3,924,721 A | 12/1975 | Reynolds |
| 4,122,478 A | 10/1978 | Gallo et al. .................... 358/4 |
| 4,536,809 A | 8/1985 | Sidman |
| 4,599,561 A | 7/1986 | Takahashi et al. .......... 324/208 |
| 4,678,973 A | 7/1987 | Elliott et al. ................. 318/254 |
| 4,694,229 A * | 9/1987 | Cormack ..................... 318/561 |
| 4,715,009 A | 12/1987 | Böhmler et al. ............ 364/565 |
| 4,794,536 A | 12/1988 | Eto et al. ............... 364/424.05 |
| 4,843,293 A * | 6/1989 | Futami ....................... 318/609 |
| 4,874,053 A | 10/1989 | Kimuraet et al. .......... 180/79.1 |
| 4,916,641 A | 4/1990 | Bybee |

(List continued on next page.)

OTHER PUBLICATIONS

Materials downloaded from web under hyperphysics.phy-astr.gsu.edu and mag–net.ee.unist.ac.uk.

Primary Examiner—John Barlow
Assistant Examiner—Tung S Lau
(74) Attorney, Agent, or Firm—Michael D. Smith

(57) ABSTRACT

Disclosed herein is a method and system for initializing a rotating device such as an electronically commutated electric machine. The system comprises: an electric machine; a position sensor subsystem operatively connected to the electric machine configured to measure a position and transmit a position signal to a controller. The controller executes a method initializing position for the electric machine, the method comprising: establishing a sensor subsystem datum indicative of a measurement reference point for a sensor subsystem; obtaining a calibration value corresponding to a distance to a selected magnetic reference position for the electric machine, relative to the sensor subsystem datum; and measuring a position and calculating a position delta relative to an initial reference. The method also includes: estimating an offset from the sensor subsystem datum to an initial reference; determining an absolute position estimate of the electric machine relative to the magnetic reference position. The absolute position estimate is responsive to the calibration value, the position delta, and the offset from the sensor subsystem datum to the initial reference.

153 Claims, 24 Drawing Sheets

U.S. PATENT DOCUMENTS

| | | | |
|---|---|---|---|
| 5,021,941 A | * 6/1991 | Ford et al. ...................... 700/71 |
| 5,062,064 A | 10/1991 | Sagues et al. ............... 364/565 |
| 5,065,324 A | 11/1991 | Oshita et al. ........... 364/424.05 |
| 5,077,507 A | * 12/1991 | Mitani et al. ................ 318/569 |
| 5,144,564 A | 9/1992 | Naidu et al. ................. 364/494 |
| 5,177,417 A | 1/1993 | Lee et al. .................... 318/254 |
| 5,203,420 A | 4/1993 | Shiraishi .................... 180/79.1 |
| 5,283,741 A | 2/1994 | Desrus .................. 364/424.05 |
| 5,397,972 A | 3/1995 | Maiocchi .................... 318/439 |
| 5,521,475 A | 5/1996 | Fu et al. ...................... 318/459 |
| 5,739,969 A | 4/1998 | Garza ........................... 360/51 |
| 5,791,432 A | 8/1998 | Fushimi et al. .............. 180/412 |
| 5,819,202 A | * 10/1998 | Sato et al. ..................... 702/33 |
| 5,892,339 A | 4/1999 | Park et al. ................... 318/254 |
| 5,898,301 A | 4/1999 | La Croix et al. ........ 324/207.22 |
| 6,014,348 A | 1/2000 | Kim .............................. 369/13 |
| 6,079,513 A | 6/2000 | Nishizaki et al. ............ 180/402 |
| 6,128,153 A | 10/2000 | Hasegawa et al. |
| 6,329,782 B1 | 12/2001 | Chen et al. .................. 318/727 |
| 2002/0024336 A1 | * 2/2002 | Desbiolles et al. ..... 324/207.25 |

* cited by examiner

Level 1 Initialization
Calibrated Low Resolution Edges

Fig.23 Level 3 Initialization - Bi-directional Calibrated Slot Set

METHOD AND APPARATUS FOR CALIBRATING AND INITIALIZING AN ELECTRONICALLY COMMUTATED MOTOR

CROSS-REFERENCE TO RELATED APPLICATIONS

This application claims the benefit of U.S. provisional application No. 60/326,289, filed Oct. 1, 2001 the contents of which are incorporated by reference herein in their entirety.

BACKGROUND

Brushless motors and controllers of various types are commonly employed in motion control. Typically, brushless motors employ two methods or types of control. Sinusoidal control technology, that is, they are commanded with a sinusoidal voltage command and maintain sinusoidal flux. Commonly, proper control of such a motor also requires the use of a high-resolution position sensor to detect the rotor position throughout the entire angular rotation. Such a sensor, and the electronics to decode and condition it are often complex and expensive. Another common method for controlling brushless motors is with trapezoidal control. With trapezoidal control, the excitation is commonly three-phase square waves, yielding trapezoidal flux wave-shapes. However, because of the inherent characteristics of the motor, the flux typically will not be exactly trapezoidal. This distortion of the flux wave shape results in the motor exhibiting torque fluctuations at each phase commutation point. Such torque fluctuations are generally undesirable.

A motor control system is depicted in FIG. 1. Accurate measurement of the position of the motor rotor is desirable to facilitate motor control. In order to measure and determine the absolute position of a motor shaft, a motor is typically equipped with a position sensor operatively coupled to the motor shaft to monitor a relative rotational position of a shaft. The position sensor may include, but not be limited to, potentiometers, synchros, Hall-effect, or variable-reluctance sensor, and the like, including combinations of the foregoing. Moreover, the position sensor generates a signal that must be accurately determinable for calibrating and initializing an electronically commutated motor.

A set of sensors may be used to determine which phase of the motor must be excited at any given time. For example, in the case of trapezoidal control, high accuracy may not be necessary and a simple set of sensors is all that is needed regarding position information. Therefore, a set of 3 sensors that yield 3 signals, typically 120 electrical degrees apart are sufficient. Electrical degree is defined as a physical rotation in mechanical degrees of the rotor divided by the number of pole pairs of the motor. In order to generate 3 signals that are each differentiated by 120 electrical degrees apart, necessitates assembling each of the sensors 120 electrical degrees apart from each other. Mechanically aligning the sensor's switch point or zero position with that of the motor may be cost prohibitive. Such position sensors are often called "commutation" sensors, because they are used to signal the controller when to commutate the motor currents from one phase to another.

Turning now to sinusoidal motor control implementations. This control technology requires knowledge of the rotor position with relationship to the motor's electromotive force (EMF). This is usually accomplished by mechanically aligning an absolute rotor position sensor with resolution on the order of a few electrical degrees, or less, to the motor's EMF. Absolute position sensors, however, are more complex to integrate and only become acceptable for applications without stringent cost restrictions. Moreover, absolute positions sensor require alignment and/or a bias calibration. This alignment process can be problematic in a high volume, manufacturing environment. The waveforms for a motor including ideally aligned low-resolution (or commutation) sensor signals are shown in FIG. 2.

BRIEF SUMMARY

Disclosed herein is a method for calibrating and initializing position for a rotating device. The method comprises: establishing a sensor subsystem datum indicative of a measurement reference point for a sensor subsystem; obtaining a calibration value corresponding to a distance to a selected magnetic reference position for the rotating device, relative to the sensor subsystem datum; and measuring a position and calculating a position delta relative to an initial reference. The method also includes: estimating an offset from the sensor subsystem datum to an initial reference; determining an absolute position estimate of the rotating device relative to the magnetic reference position. The absolute position estimate is responsive to the calibration value, the position delta, and the offset from the sensor subsystem datum to the initial reference.

Also disclosed herein is a system for calibrating and initializing an electronically commutated electric machine. The system comprising: an electric machine; a position sensor subsystem operatively connected to the electric machine configured to measure a position and transmit a position signal to a controller; an absolute position sensor operatively connected to the controller and transmitting a position signal indicative of an absolute position of the electric machine. The system also includes a relative position sensor operatively connected to the controller and transmitting a position signal indicative of a position of the electric machine. The controller executes a process implementing a method for calibrating and initializing position for the electric machine, the method comprising: establishing a sensor subsystem datum indicative of a measurement reference point for a sensor subsystem; obtaining a calibration value corresponding to a distance to a selected magnetic reference position for the electric machine, relative to the sensor subsystem datum; and measuring a position and calculating a position delta relative to an initial reference. The method also includes: estimating an offset from the sensor subsystem datum to an initial reference; determining an absolute position estimate of the electric machine relative to the magnetic reference position. The absolute position estimate is responsive to the calibration value, the position delta, and the offset from the sensor subsystem datum to the initial reference.

DETAILED DESCRIPTION OF AN EXEMPLARY EMBODIMENT

Disclosed herein is a method and system utilizing a combination of algorithms and calibration procedures to minimize or remove the inherent difficulties with the mechanical build and alignment process for a position sensor. Specifically, an initialization procedure and algorithm to align a position sensor with a rotor of an electric machine and accurately ascertain the position thereof are disclosed.

It is noted that although the disclosed embodiments are described by way of reference to motor and motor control, it will be appreciated that such references are illustrative only and the disclosed embodiments may be applied to any rotating device including, but not limited to, electric machines wherein the position of the rotor is to be measured or determined. Moreover, while references and descriptions herein may apply to many forms of electric machines including, but not limited to, motors, or more specifically sinusoidally excited brushless motors, hereafter, for brevity and simplicity, reference will be made to motors only without limitation.

Figure 1:
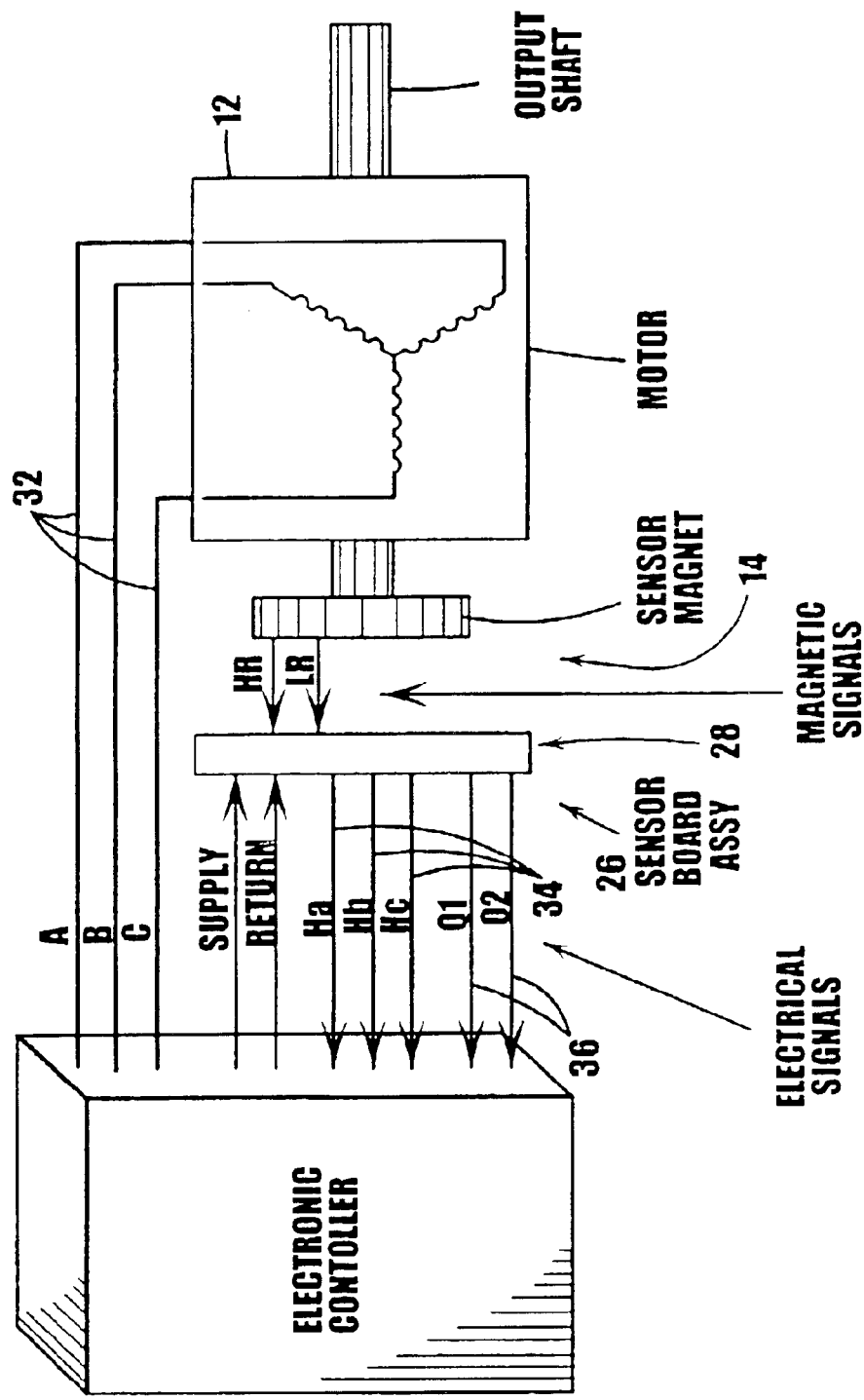
FIG. 1 illustrates a schematic diagram of a motor control system.
Figure 2:
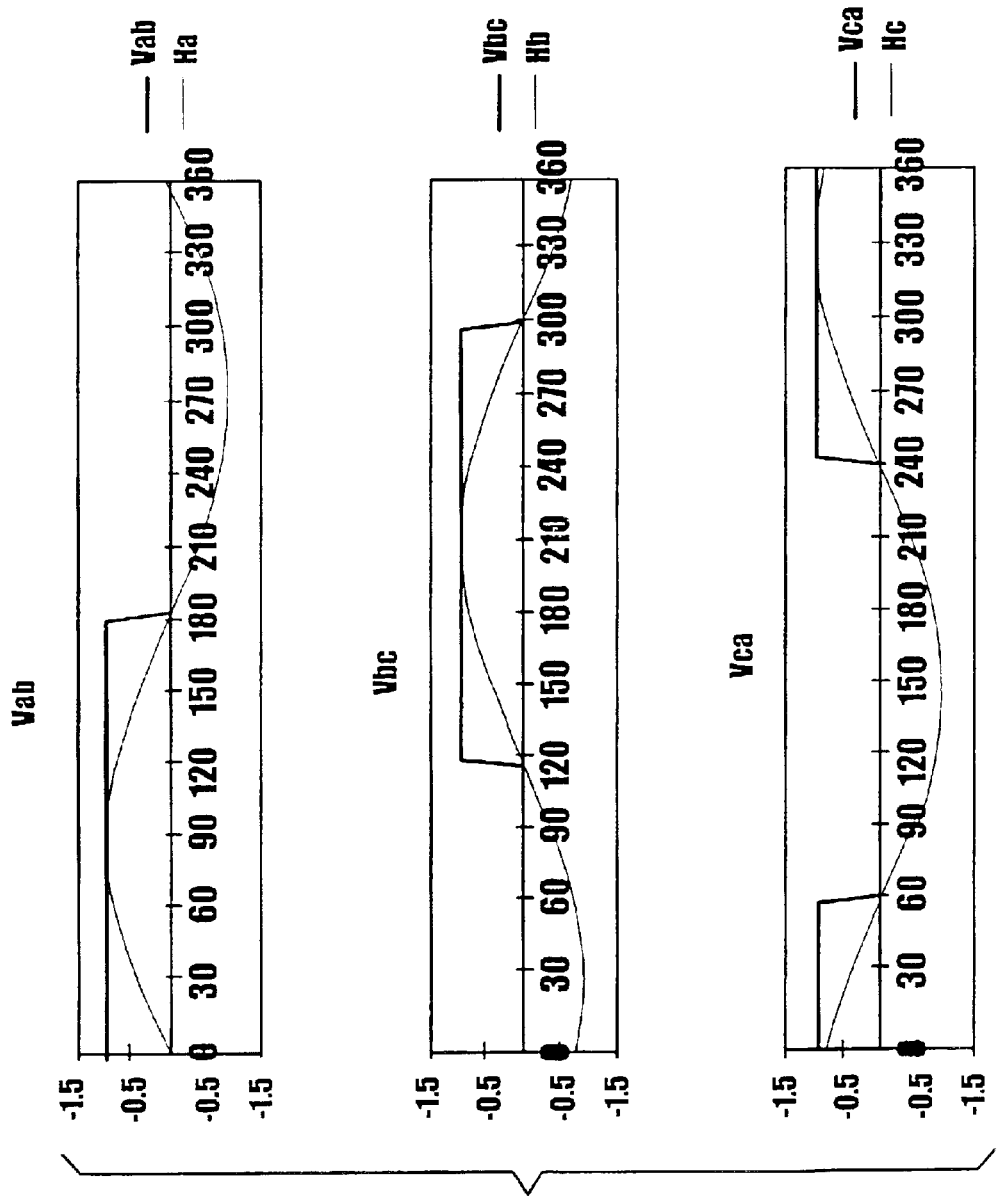
FIG. 2 illustrates waveforms for ideally aligned sensors.

An exemplary architecture for the sinusoidal motor control is shown in FIG. 1. The major components include, but are not limited to, a controller 18, which may include a switching device or inverter assembly hereinafter inverter 20, a rotating device, in this instance and hereafter, a three-phase brushless motor 12, position sensor subsystem 14 comprising a sensor magnet 16, and a sensor board assembly 26. The controller 18 is utilized to compute the motor position and to deliver the required output power to each of the motor's three phases.

Controller 18 is disposed in communication with the various systems and sensors of the motor control system. Controller 18 receives signals from each of the system sensors, quantifies the received information, and provides an output command signal(s) in response thereto, in this instance, for example, to the motor 12.

In order to perform the prescribed functions and desired processing, as well as the computations therefore (e.g., the calibration and initialization algorithm(s), and the like), controller 18 may include, but not be limited to, a processor(s), computer(s), memory, storage, register(s), timing, interrupt(s), communication interface(s), and input/output signal interfaces, and the like, as well as combinations comprising at least one of the foregoing. For example, controller 18 may include input signal filtering to enable accurate sampling and conversion or acquisitions of such signals from communications interfaces. Additional features of controller 18 and certain processes therein are thoroughly discussed at a later point herein.

Figure 3:
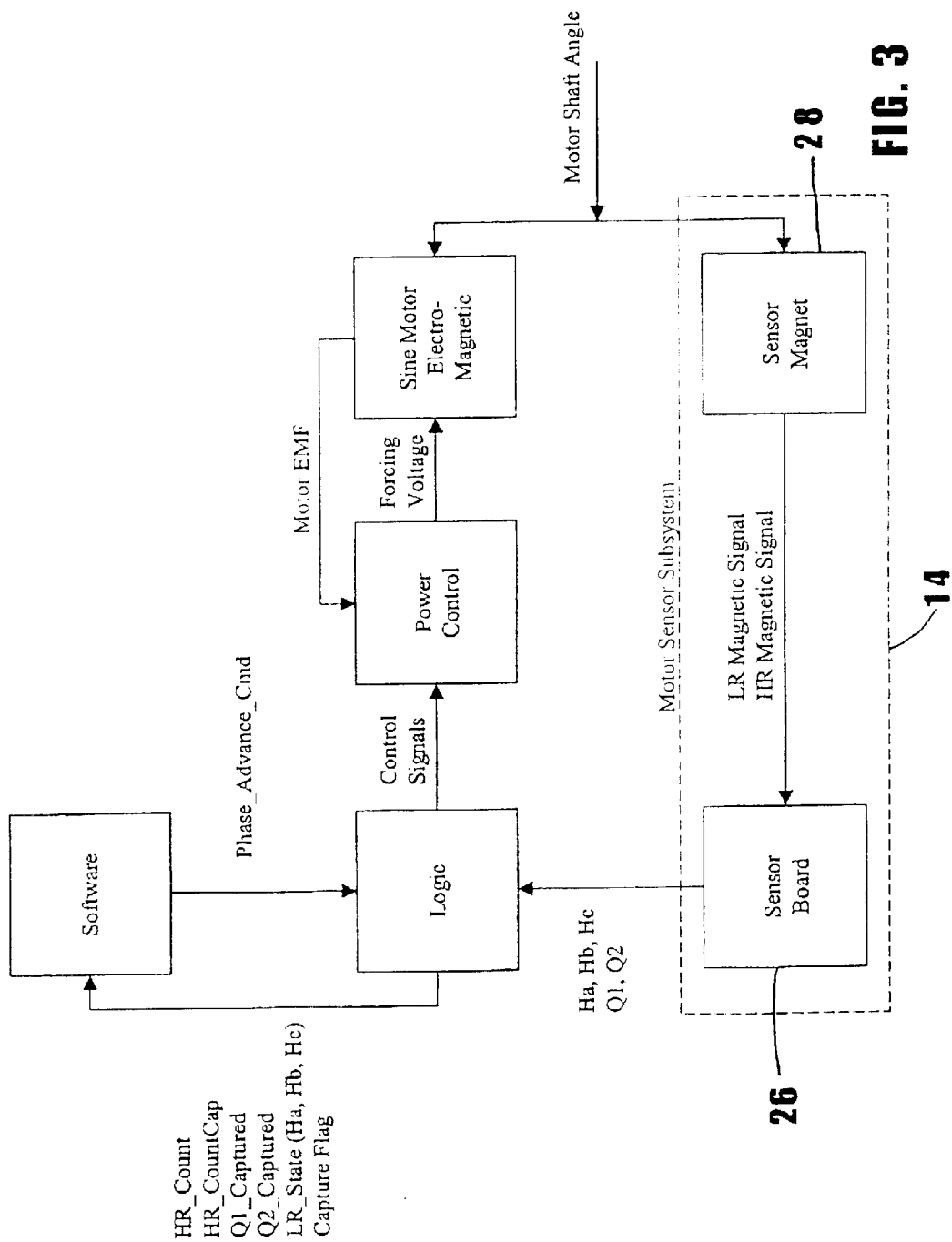
FIG. 3 is block diagram of a motor control system and data flow.
Figure 9:
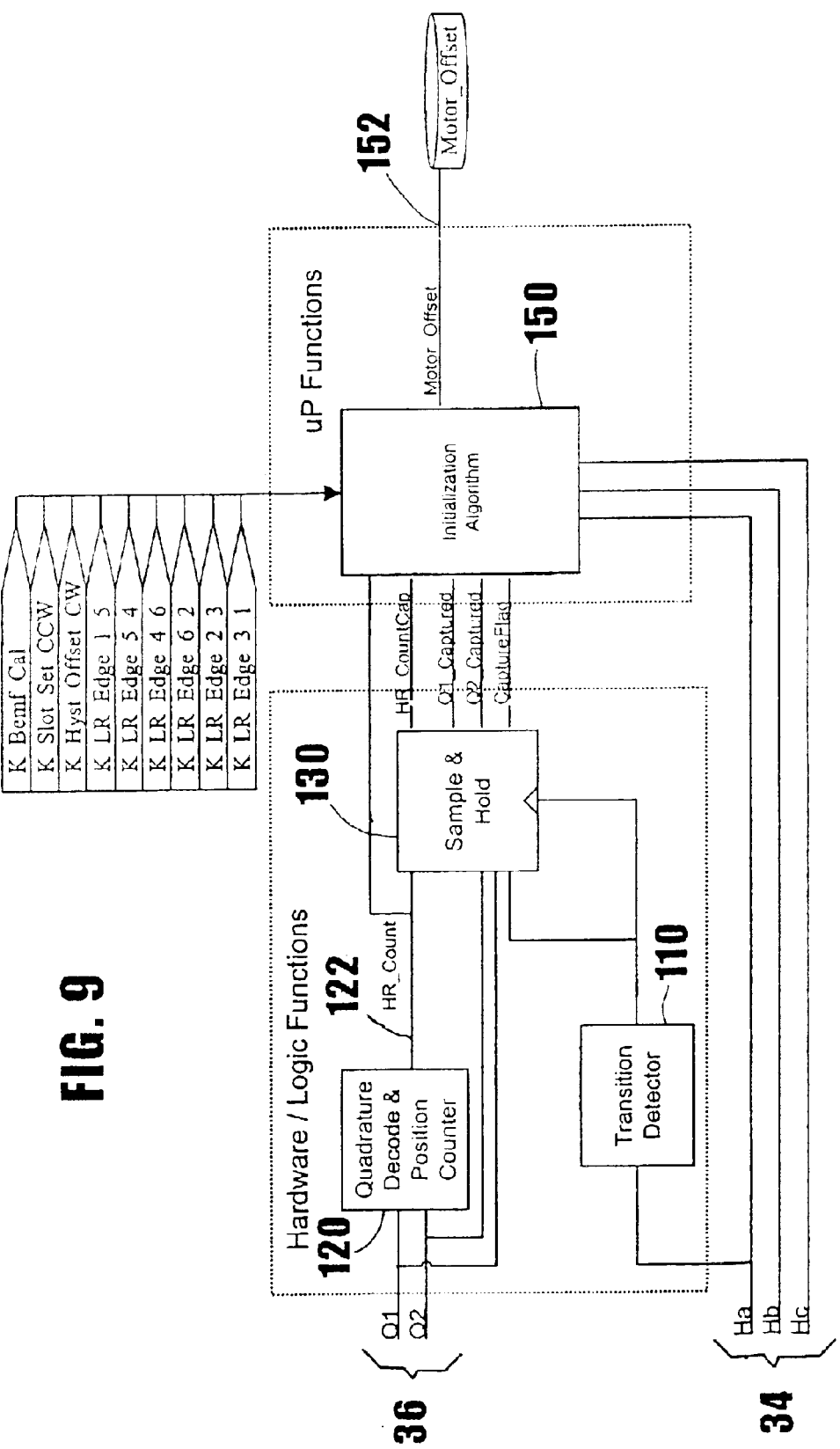
FIG. 9 depicts high-level logic and software signal flow.

As exemplified in a disclosed embodiment, and as depicted in FIGS. 3 and 9, one such process may be determining from various system measurements, parameters, and states the appropriate compensation for initializing the position measurement for the motor 12 (e.g., a calculated offset between the measured position and the actual position of the rotor of the motor 12). Controller 18 receives various input signals including, but not limited to, those identified above, to facilitate such processing and may provide one or more output signals in response.

Figure 11:
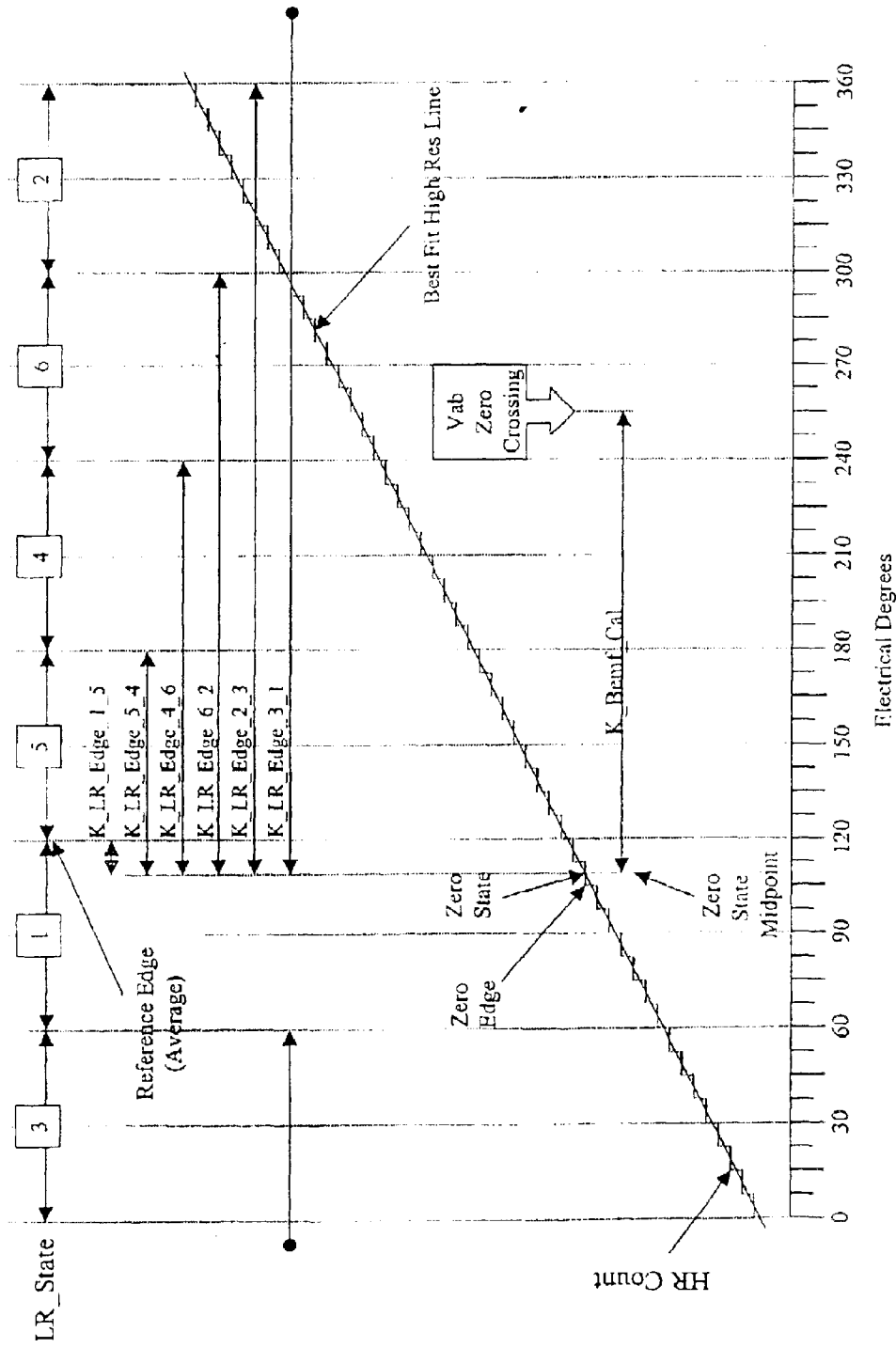
FIG. 11 depicts the signal relationships and definitions for the sensor system.
Figure 12:
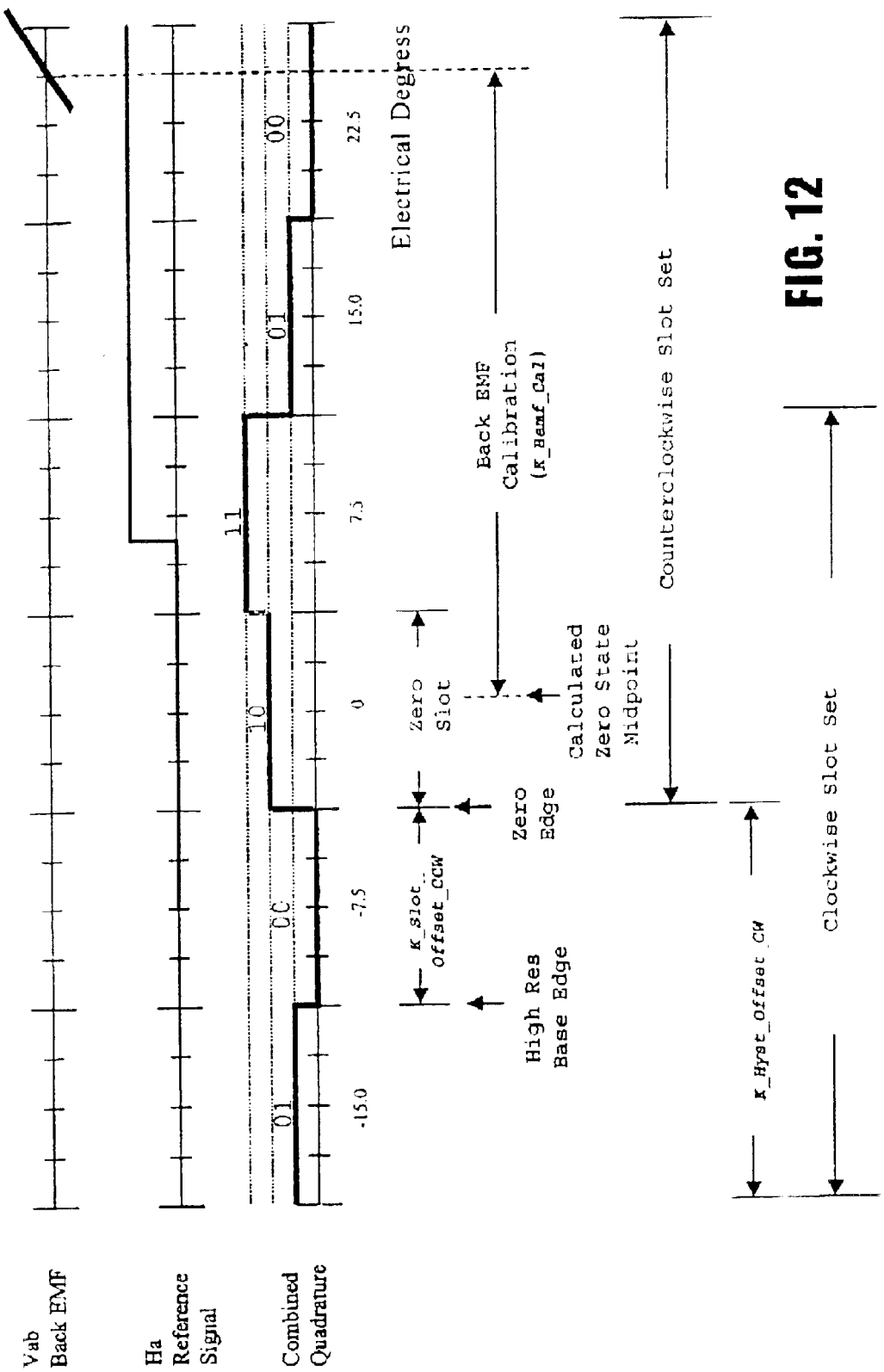
FIG. 12 depicts slot set definitions.

In an embodiment, the controller 18 obtains as input signals or receives signals to facilitate computing the following, among others: Two position signals 36 and hereinafter also denoted $Q_1$ and $Q_2$ respectively are representative of a relative position of the motor 12. Three low-resolution signals 34a, 34b, and 34c hereinafter denoted $H_a$, $H_b$, and $H_c$ respectively representative of the position of the motor 12; and, a variety of implementation specific parameters, signals and values for initialization of the prescribed processes and to identify various states of the processes herein. For example, a back EMF calibration value, K_Bemf_Cal, which is defined as the numerical representation of the angle of offset that will align a selected magnetic reference point or zero point of the motor 12 with sensor subsystem 14 datum e.g., a zero point or reference point. Referring also to FIG. 12, a graphical depiction of the signal definitions is provided. In an exemplary embodiment, for counterclockwise rotation, the positive going zero crossing of the back EMF voltage of the $V_{ab}$ line voltage is selected as the zero point or reference for the magnetics of the motor 12. Similarly, a second reference point or datum is selected, in this instance for the sensor assembly. In an exemplary embodiment, this datum or reference point is selected as the zero midpoint as depicted in FIG. 12. The zero midpoint is selected based on the sensor subsystem 14. It is noteworthy to appreciate that FIGS. 11 and 12 depict idealized signal transitions without any real world errors. The actual signals will exhibit variation in their switching location. Therefore, the zero midpoint is actually a calculated point that is based on the computed best fit line for all high resolution states (in both directions) and the selected counterclockwise slot set. Therefore, for example, the K_Bemf_Cal is a measure of the distance in electrical degrees (or counts related thereto), between the positive going zero crossing of the back EMF voltage of the $V_{ab}$ line voltage and the zero midpoint. The K_Bemf_Cal is a characteristic of each motor assembly, namely the rotor, stator, and sensor assembly. Upon connection of the sensor subsystem 14 to the rotor shaft of the motor 12, the relationship between the sensor subsystem 14 and the magnetics is fixed and determinable. Therefore, the back EMF calibration value may be readily measured and determined employing existing testing techniques.

It will be appreciated that the zero mid point or references selected as disclosed above, are arbitrary and should be understood to be just illustrative of many other conceivable selections for references. The reference points disclosed have been selected primarily based on factors that facilitate a particular implementation are by no means limited. As with any measurement system, selection of a reference point is generally made to facilitate later implementation, processing, or computation. It should be evident that numerous other measurement systems and references are feasible.

Figure 4:
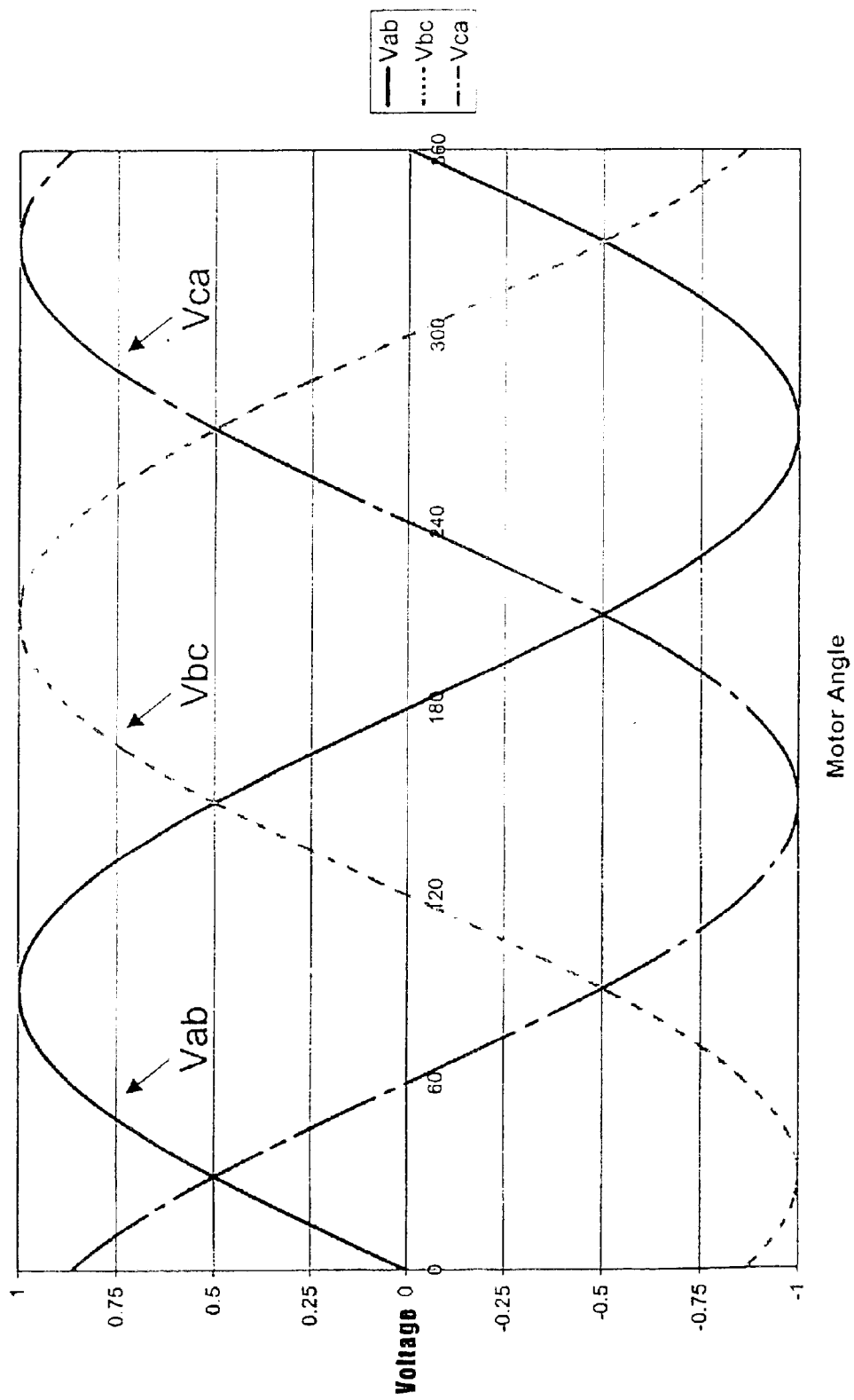
FIG. 4 depicts typical motor phase voltages.
Figure 5:
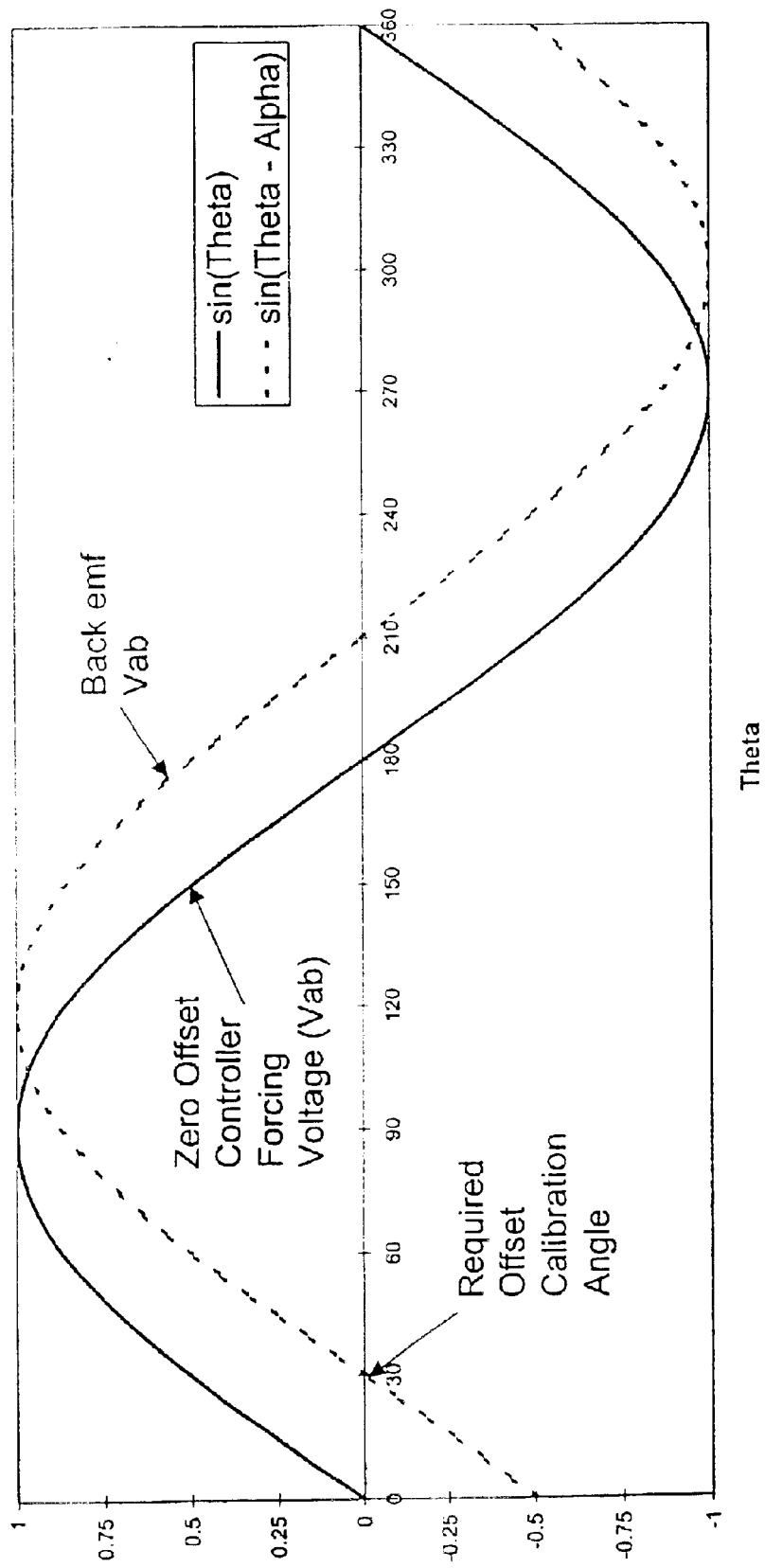
FIG. 5 depicts a timing diagram with a calibration angle.

A back EMF calibration value, K_Bemf_Cal is depicted in the waveforms shown in FIG. 5. Controller 18 generates as output signals the command voltages to the motor 12. The ideal command motor voltages $V_{ab}$, $V_{bc}$, and $V_{ca}$ are depicted in FIG. 4. The ideal motor phase voltages are typically defined as:

$$V_{ab} = V_{ref} \sin(\theta)$$

$$V_{bc} = V_{ref} \sin(\theta - 120°)$$

$$V_{ca} = V_{ref} \sin(\theta - 240°)$$

where $V_{ref}$ identifies the commanded amplitude, and $\theta$ identifies the position of the motor in its rotation in electrical degrees.

Figure 6:
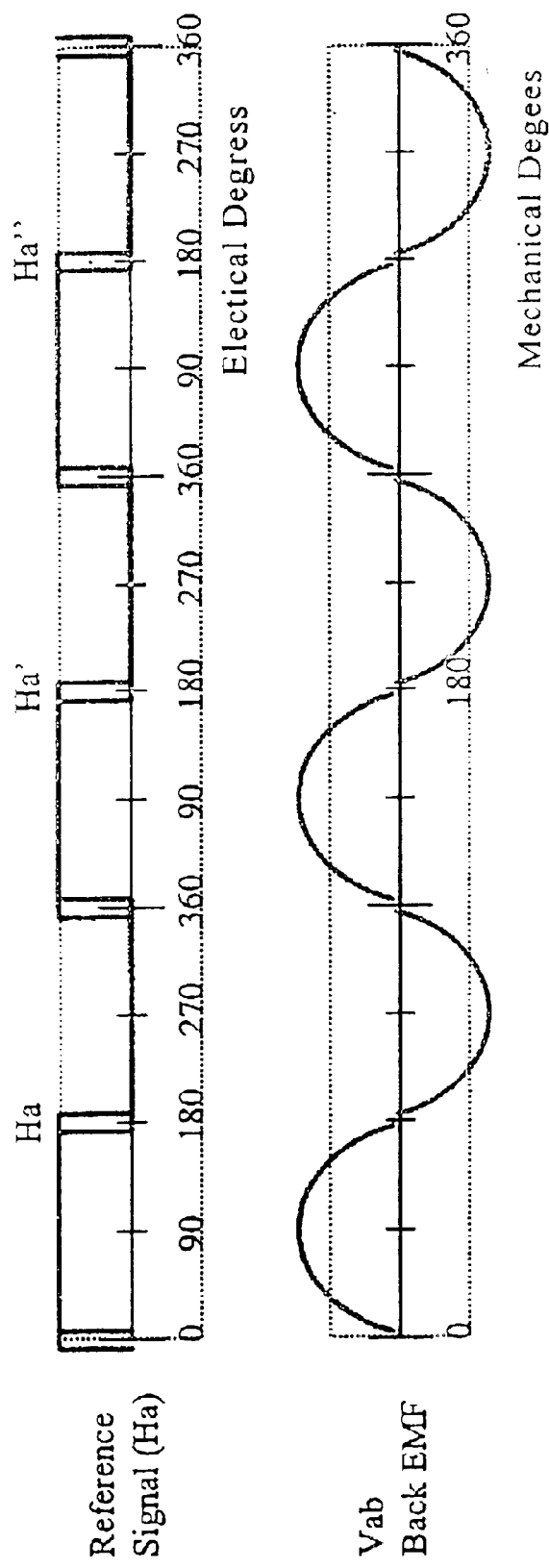
FIG. 6 depicts corresponding electrical and mechanical Cycles for a six-pole motor.

Referring also now to FIG. 6, it should be noted that the relationship between the electrical rotational cycles and the mechanical rotational cycles are different by a factor of the number of poles divided by 2. For example, in a six pole motor design as discussed with the exemplary embodiment, the electrical frequency and the mechanical frequency differ by a factor of three. It should also be noted that since the electrical cycle repeats three times per mechanical cycle, signals that are generated as a function of the electrical position (e.g., the reference transition) actually represent three slightly different points on the mechanical cycle. Moreover, it is noteworthy to appreciate that for the motor 12 in an exemplary embodiment, the electrical cycles are substantially identical to one another. However, for the sensor subsystem 14, the three electrical cycles are similar but may not be exactly identical. Such variation in the sensor subsystem is accounted for on the initialization and calibration method and apparatus disclosed herein.

In an exemplary embodiment, motor initialization 100 executed by controller 18 generates a computed motor offset to facilitate the accurate initialization of the measured position. The initialization is accomplished by executing a series of evaluations and measurements. Resultant from each evaluation, additional information is "learned" which is utilized to refine the subsequent tests. In an exemplary embodiment, at least one of three levels of evaluation or initialization are processed, and thereby, a computed offset indicative of the position of the rotor shaft of the motor 12 is obtained.

The primary function of the motor 12 is to convert electrical power into mechanical power. To generate the sinusoidal motor currents the inverter 20 may include switching devices (e.g., MOSFETS, Triacs, SCRs, transistors, and the like including combinations comprising at least one of the foregoing) which, must be turned on and off at specific rotor angular positions. Therefore, the position of the rotor of the motor 12 should be determined whether by measurement or estimation. A position sensor subsystem 14 may be utilized to identify the rotary position of the rotor of the motor 12. Popular methods utilized to sense rotary position are based on potentiometers, synchros, or resolvers, optical detection, and magnetic field variation. Some include the advantage of non-contact sensing and separate sensing and target components. Synchros, and resolvers are also non-contacting, but usually require more sophisticated signal interfaces for processing and are often very costly. Optical encoders detect the passage of various weighted targets correlated to a position. Optical encoders however, are often temperature limited and may be susceptible to interference and contamination. Magnetic sensors (for instance, magnetoresistors, or MR's, Hall effect, and the like), on the other hand, tolerate temperature extremes and are less susceptible to contamination but typically cannot achieve the higher resolution and accuracy of the previously mentioned sensors. Therefore, magnetic sensors enjoy wide use in motor control applications, including, but not limited to, the automotive industry. In an exemplary embodiment a position initialization calculation process is disclosed for a magnetic position sensor subsystem 14 comprising a magnetic device, the sensor magnet 16 and a sensing element, which is part of the sensor board assembly 26.

In an embodiment, the sensor magnet 16 is used to generate a motor rotor position dependent magnetic field, which can be detected by sensing elements 28 of the sensor board assembly 26. The sensor magnet 16 includes, but is not limited to, a set of low-resolution poles 22, and a set of high-resolution poles 23. The sensor board assembly 26 includes devices configured to sense the magnetic positional information and convert the information into electrical signals. In an exemplary embodiment, the sensing elements 28 include Hall effect sensor(s) arranged and configured to detect the changes in magnetic field from passage of sensor magnet 16 as the motor 12 rotates. The electrical signals representative of the rotational position of the shaft of the motor 12 are addressed at a later point herein. In an exemplary embodiment, position sensor orientation calibration values may be established at the end of the motor build and sensor assembly process. These calibrations result in information pertinent to ascertaining the orientation of the position sensor subsystem 14 relative to the rotor of the motor 12 and stator of the motor. During the assembly of motor control system, the calibration values are ascertained by measurement and may be utilized by the controller for subsequent processing. The calibration values are also saved in a non-volatile memory to facilitate the processes disclosed herein. Details of the characteristics of particular calibrations and their values are provided hereafter. At each controller initialization cycle, the controller 18 utilizes the motor position calibration values to properly align the sensor subsystem 14 datum e.g., the zero mid point to the selected reference point (the positive going zero crossing of the back emf of $V_{ab}$) of the magnetics of the motor. Thereby facilitating generation of forcing voltage functions $V_{ab}$, $V_{bc}$, and $V_{ca}$ 32 of the motor 12. In an exemplary embodiment, the alignment is accomplished with a three-level, position dependent initialization process.

The motor control system described in the exemplary embodiments utilizes a sinusoidally controlled brushless motor 12. A primary characteristic of a sinusoidal motor is that its generated voltage (or EMF), is also sinusoidal relative to the motor angular position and the forcing voltage functions $V_{ab}$, $V_{bc}$, and $V_{ca}$ 32. As mentioned earlier, in order to achieve a desirable reduction in the overall torque ripple in the motor 12, the forcing line-to-line voltage ($V_{ab}$ for instance) is timed to phase match the motor's corresponding phase EMF. This, in turn, requires that the controller 18 (or inverter 20) be capable of delivering a pseudo or nearly sinusoidal waveform relative to the rotor position of the motor 12. Therefore, the controller 18 depends on rotor position information of sufficient resolution to enable developing the requisite sinusoidal waveform. The disclosed embodiment facilitates developing, processing and application of the position sensor information to facilitate a system motor control function.

To facilitate explanation of the disclosed embodiments herein several different measurement coordinates or units and terms are utilized. These will be briefly reviewed for clarification as to the intended interpretation:

Degrees Electrical ($°^{elect}$) is a measure of the electrical angle of the motor. In the disclosed embodiments for example, a six-pole motor has been utilized. Therefore, the six-pole motor has three electrical cycles for each mechanical rotation of the motor.

Degrees Mechanical ($°^{mech}$) is a measure of the mechanical angle of the motor. For example, measure of the actual physical rotational angle of the rotor of the motor 12.

Low-resolution Counts (counts$_{LR}$) is a measure of low-resolution states. The low-resolution states are generated by a combination of the low-resolution position signals ($H_a$, $H_b$, and $H_c$).

High-Resolution Counts (counts$_{HR}$) is a measure of high-resolution states. The high-resolution states are generated by a combination of the high-resolution position signals 36 ($Q_1$ and $Q_2$).

Phase Advance Counts (counts$_{PA}$) is a measure of phase advance control units (¼ counts$_{HR}$). The phase advance counts are required as part of the motor control algorithm. These units are the highest resolution measurement of the motor position and are used for all of the offset calibration values.

Back EMF, Bemf—Voltage generated by the motor during rotation.

EMF—Electro-motive force, voltage generated by a motor.

Forcing Voltage—Voltage applied by a controller on a motor.

Electrical cycle—A completed period for an electrical signal.

Mechanical cycle—A completed period (or rotation) for the mechanical parts.

Hall Sensor—A sensing element used to convert magnetic field signals into electrical signals.

High-Resolution Hall Sensors—A pair of hall sensors placed such that the electrical output is in quadrature. The quadrature signal can be used to develop a relative position signals by the control electronics.

Hysteresis—An condition where the output is dependent upon the previous output state as well as the input parameter.

Level 1 Initialization—Initialization of the motor sensor subsystem by using only the state information from the low-resolution sensors.

Level 2 Initialization—Initialization of the motor sensor subsystem by using the low-resolution transition point to estimate motor position.

Level 3 Initialization—Initialization of the motor sensor subsystem by using a reference low-resolution transition and the high-resolution state information to determine the motor position.

Low-resolution (LR) Transition—Any state change of the low-resolution sensor signals.

Low-resolution Hall Sensors—The Hall sensors, which are comprised of three digital signals and generate 6 states per electrical cycle.

Low-resolution State (LR_State)—A unique combination of the low-resolution hall sensor signals. The low-resolution states are nominally 60° elect in width.

LUT (Look Up Table)—Typically a table placed in memory that can be referenced via an index pointer to "look up" a value.

Phase Advance—A method of changing the relationship between the forcing function and the motor's EMF. This is typically used to improve motor performance by compensating for the inherent signal delays due to motor inductance and resistance.

Quadrature—A pair of signals offset by 90°.

Reference Edge—The low-resolution transition that is indirectly used to reference the motor's EMF to the sensor subsystem.

Slot Set—A group of consecutive high-resolution sensor states, for example four selected consecutive high-resolution sensor states).

Zero Crossing—The point where the signal crosses from either a positive value to a negative value or from a negative value to a positive value.

Zero Edge—The high-resolution edge defined to be the point where the compensated motor counter should transition from 191 counts to 0 counts.

Rev$_E$—Electrical revolution.

Rev$_M$—Mechanical revolution.

Moreover, the following sign conventions have been defined to facilitate consistency and understanding of the disclosed embodiments. When looking down the motor shaft from the mechanical output end, the motor is defined as rotating in a positive direction when spinning counterclockwise.

In an exemplary embodiment, a position sensor subsystem 14, is configured to provide position information to a motor control system for adequate motor control. The position sensing processing requirements may be divided into two major operational categories. First, accuracy of the position sensing, in this case, with respect to the back EMF of the motor 12. Second, resolution of the position sensing, whether of the sensing elements, or of any subsequent processing thereafter. Additionally, it is noteworthy to appreciate, that such requirements should preferably also be considered as a function of time (or initial positional displacement). Moreover, the requirements for the position sensor subsystem 14 may be dynamic and therefore, change based on the initialization processes of the motor control system. In an exemplary embodiment, the position sensor subsystem 14 and subsequent processing disclosed herein cooperate to provide immediate information on the electrical position to within a selected accuracy whether the motor is moving or not.

It will be appreciated that an absolute encoder or position sensor may be well suited to meet the stated objectives, however, at a relatively high cost compared to other sensing technologies. Therefore, it will be appreciated that it is beneficial to provide a position sensing capability with desired accuracy, nearly instantaneously, at lower cost. Referring once again to FIG. 7 and FIG. 8, for an exemplary embodiment, a combined system is employed to satisfy both cost and accuracy constraints. That is, within an electrical cycle, sensing elements 28 include low-resolution (absolute) sensors 24 generate low-resolution position signals 34 denoted $H_a$, $H_b$, and $H_c$, respectively as well as a high-resolution (relative) sensor 25, which generates high-resolution position signals 36 denoted $Q_1$ and $Q_2$ respectively.

In an embodiment, an apparatus for generating the above-mentioned signals and a method of combining the information from the two sensor types is disclosed. More specifically, position information obtained from a low-resolution sensor 24 is utilized to initialize the relative position obtained from a high-resolution sensor 25. Essentially, low-resolution position signals 34 $H_a$, $H_b$, and $H_c$ are used to generate an initial estimate of the electrical position of the rotor of the motor 12. That is, the position of the motor 12 within a particular one third of its mechanical rotation and relative to the excitation voltages. It should be appreciated that the low-resolution sensor signals will indicate the electrical position of the motor to within +/−30 ($^{oelect}$).

Figure 7:
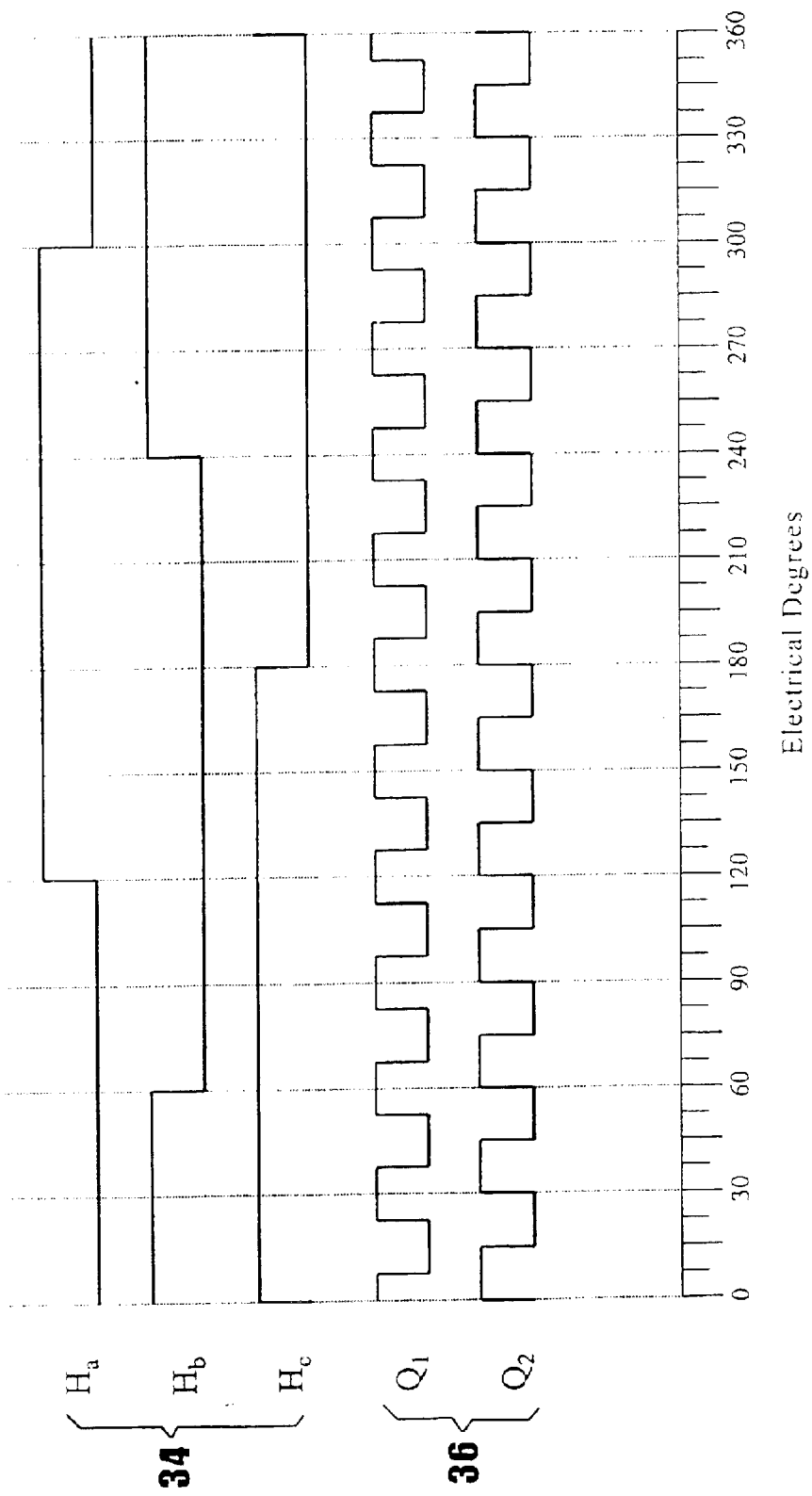
FIG. 7 depicts ideal sensor subsystem waveforms as a function of electrical angle.

FIG. 7 depicts the defined low-resolution position signals ($H_a$, $H_b$, and $H_c$) 34a, 34b, and 34c respectively and high-resolution position signals 36 $Q_1$ and $Q_2$ as a function of electrical angle. In an exemplary embodiment, low-resolution position signals ($H_a$, $H_b$, and $H_c$) 34a, 34b, and 34c respectively are three dual state (binary) signals generated by three Hall effect sensors spaced 120 electrical degrees apart, detecting the passing of the low resolution poles 22 of the sensor magnet 16, the high-resolution position signals are two dual state (binary) signals in quadrature generated by two Hall effect sensors detecting the passing of the high resolution poles 23 of the sensor magnet 16. It is noteworthy to appreciate as depicted in the figure the physical and electrical relationship between the low-resolution position and the magnetics of the motor. More particularly that 1 complete cycle for the low-resolution position signals corresponds to a complete electrical cycle of 360 degrees.

Figure 8:
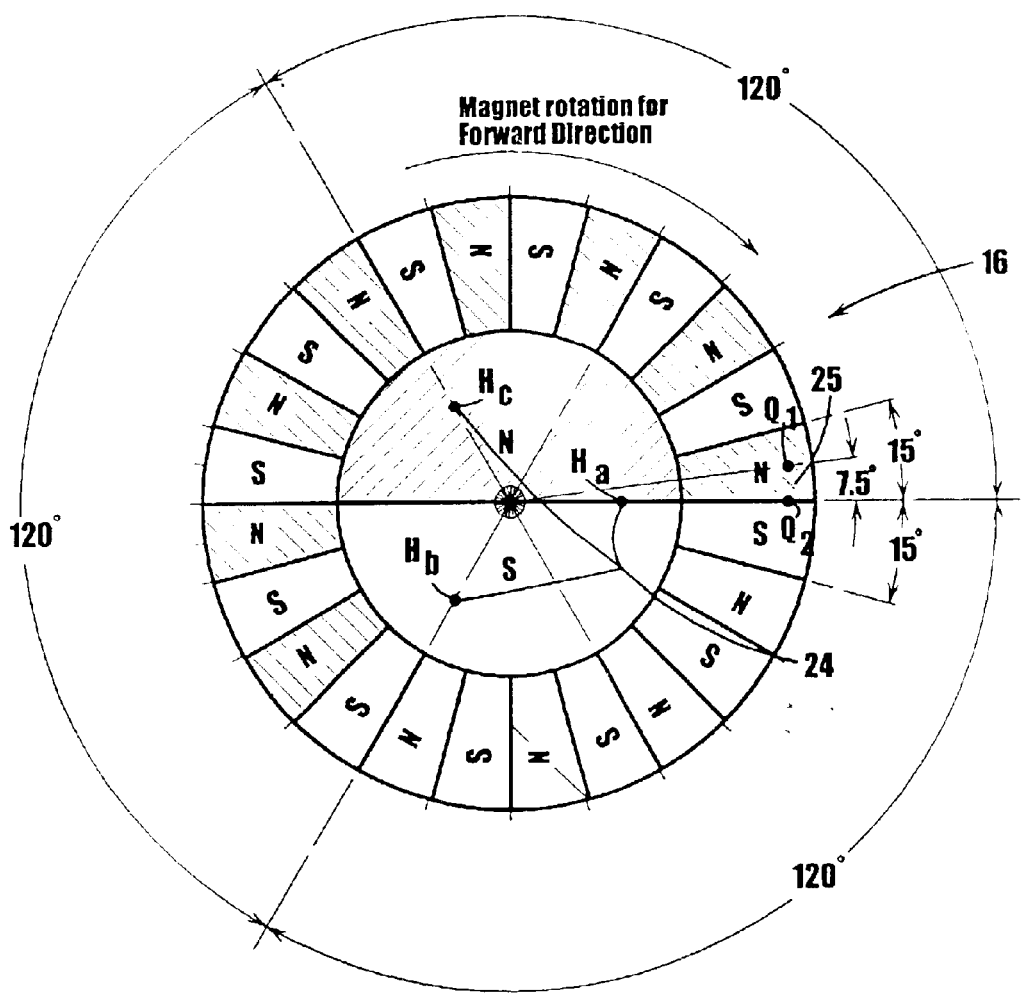
FIG. 8 presents a graphical representation of an exemplary sense magnet.

FIG. 8 depicts a representation of a magnet and corresponding Hall sensor (e.g., 24, and 25) placements that may be utilized in order to develop the ideal low-resolution position signals 34 $H_a$, $H_b$, and $H_c$ and high-resolution position signals, $Q_1$ and $Q_2$ 36 respectively. It should be noted that the magnet representation as depicted, is shown for only one electrical cycle of the three per mechanical rotation. In other words, a magnet for a six pole machine (mechanical representation) would require three times the magnetic transitions for both the high-resolution sensor 25 and the low-resolution sensor 24 to achieve the expected results.

Signal Processes

Turning now to FIG. 9, a diagram of high level signal flow and processes executed by controller 18 to achieve the desired position sensing capabilities is depicted. Controller 18 performs the following functions which include, but are not limited to: a decode of the quadrature high-resolution position signals, $Q_1$ and $Q_2$ 36 from the high-resolution position sensor 25 and a count value at counter 120, identification and detection of a selected reference edge transition at transition detector 110, capture of selected signals and states at the moment of the transition preferably in a time coherent manner at sample and hold 130, and computation of an offset value 152 denoted Motor_Offset as a function of the signals at motor offset algorithm 140. In the exemplary embodiment, hardware, logic, and the software are combined in a particular implementation to provide the appropriate initialization and functionality for the motor control system and particularly the sensor subsystem 14.

It should be appreciated that the exemplary embodiment may be described via particular processes and implementations thereof; however, such an implementation should be viewed as illustrative only, and not construed as limiting the scope of the disclosed invention. FIG. 9 is a block diagram that represents one of several possible functional partitions between hardware and the software. As depicted at transition detector 110, a selected detectable transition of a low-resolution sensor 24 is utilized to compensate a motor position counter value 122 hereinafter denoted HR_Count in order to provide the correct absolute position signal. The HR_Count 122 is developed employing a typical binary count from the incremental changes of the high-resolution position signals, $Q_1$ and $Q_2$ 36 respectively as depicted at the quadrature decode and position counter, hereinafter position counter 120. A capture of the state of various signals is performed at sample and hold process 130 to facilitate the processes. Finally at initialization algorithm 150, the computation of the motor offset value 152, Motor_Offset in light of the captured signals is computed.

In an exemplary embodiment and accordance with a common sign convention, the position counter 120 or more specifically the counter value HR_Count 122 will increment when the motor rotor rotates in a counter clockwise direction (observed from the output shaft end), conversely it will decrement when the rotor rotates in a clockwise direction. Moreover, the position counter 120 counts only when a measured transition in the high-resolution position signals, $Q_1$ and $Q_2$ 36 occurs. Therefore, a counting range from 0 to 47 for the HR_Count 122 proves sufficient to cover the range of possible inputs for $360^{oelect}$ travel. To facilitate control functions and processes associated with those disclosed herein, the position counter 120 value HR_Count 122 is multiplied by a scaling factor of 4 to convert to phase advance counts (counts$_{PA}$) (0–191). It may be noted that the multiplication may be a simple arithmetic scaling by 4 that may be accomplished either in the digital logic or the software or other equivalent means or methods. It should also be noted that the scaling factor of 4 is an arbitrarily defined constant for this system chosen merely for implementation purposes. Any constant value may be used. In an exemplary embodiment, to facilitate execution of the processes herein, the position counter 120, or more specifically the position counter value HR_Count 122 is cleared to zero during the startup process. This assures that the count always starts at a zero point for each initialization. Once again, it should be noted that while in an exemplary embodiment the HR_Count 122 is stated as cleared to zero on startup, it may very well be that the processing could be executed which includes subtracting the initial value of the HR_Count 122 at startup for all subsequent values thereof. Such processing would yield the same values for the HR_Count 122 as described above. It should be apparent, that there exist numerous variations for the count processing, and that any one selected is conceivable within the realm of the processes disclosed herein.

Figure 10:
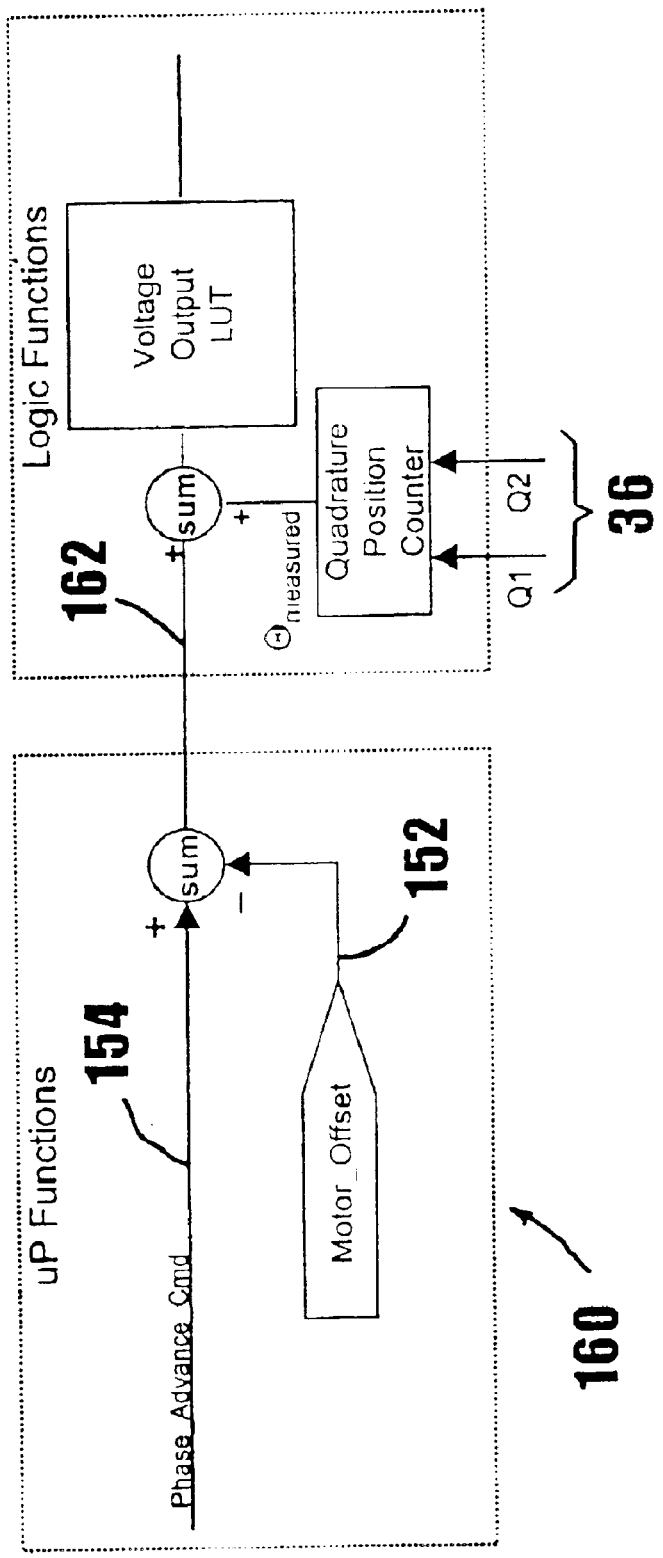
FIG. 10 depicts phase angle signal flow and position computation.

Once again, in an exemplary embodiment, the computed Motor_Offset is combined with a phase advance command 154 denoted Phase_Advance_Cmd as depicted in FIG. 10. FIG. 10 depicts a phase angle signal flow and motor position computation. The Phase_Advance_Cmd combined with the Motor_Offset yields an angular offset 162 that can represent any value from 0 to 360 degrees. This is a logical place to compensate the signal since the Motor_Offset value changes during the initialization phase of the motor sensor subsystem operation. It is noteworthy to appreciate under most conditions and implementations the Motor_Offset 152 value will remain constant after Level 3 initialization is complete. Therefore, in an exemplary embodiment, the angular offset value need not be computed any faster than the Phase_Advance_Cmd changes. This technique optimizes processing available by not executing calculation processes at a rate any faster than needed (e.g., no faster than the slowest process or as other processes require). This technique does not preclude other methods from being utilized if other factors necessitate.

Figure 24:
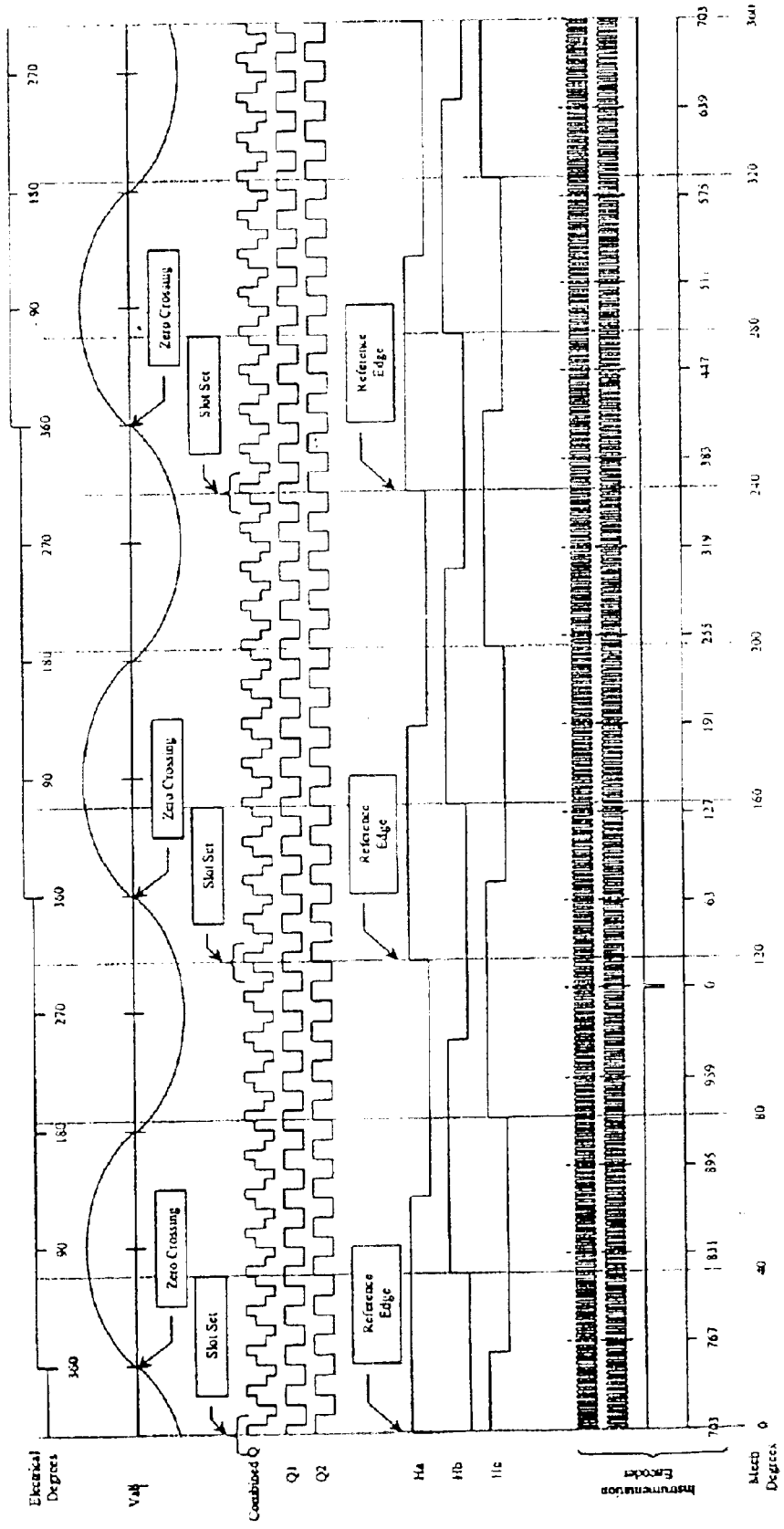
FIG. 24: depicts motor sensor system electrical signals.

FIG. 11 is a diagram depicting signal definitions and their relationships as a function of electrical angle for an exemplary embodiment. FIG. 24 depicts selected idealized signals and their interrelationships. The figures include various signals and definitions of relationships to facilitate description of an exemplary embodiment. It should be evident, that alternative definitions are possible without deviating from the scope of the disclosure herein. Moreover, several shorthand notations are employed to facilitate the discussion herein. Therefore, it is now appropriate to introduce these notations and the relationships between the various parameters. First, introduction of a shorthand related to the state of the low-resolution position signals $H_a$, $H_b$, and $H_c$. A Boolean combination of the three binary state signals yields eight possible states. Therefore, a variable indicative of these states is introduced, denoted LR_State, with decimal values 1–6. It is noteworthy to appreciate the there is no LR_State 0 corresponding to all three low-resolution position signals 34, $H_a$, $H_b$, and $H_c$ being low (e.g., inactive or a zero), nor is there a LR_State 7 corresponding to all three low-resolution position signals 34, $H_a$, $H_b$, and $H_c$ being high (e.g., active or a one), as these states are not possible with the defined configuration of the low-resolution position signals 34 $H_a$, $H_b$, and $H_c$. This is evident with observation of the signal timing as depicted in FIG. 7. Continuing with FIG. 11, it will now be apparent that each LR_State covers a duration of $60^{\circ elect}$. More over, the transition LR_State 1 to LR_State 5 is defined as a reference transition or reference edge. That is, a transition of low-resolution position signal 34a $H_a$ when signals 34b $H_b$ is low and 34c $H_c$ is high respectively or vice versa. Numerically, employing the shorthand introduced above, it is any transition from LR_State 5 to LR_State 1 or visa versa.

FIG. 11 also depicts an offset calibration referenced to the best-fit line through the output of high-resolution sensor the HR_Count relative to an arbitrary theoretical zero crossing for the forcing voltage $V_{ab}$. The calibration offset value, K_Bemf_Cal is defined as always being only positive, therefore, an instance where a zero edge leads the $V_{ab}$ zero crossing will result in a large offset value. The zero edge, once again, is a defined parameter to facilitate description of the exemplary embodiment. Further discussion and definition is provided herein associated with FIG. 12. It is also of note to recognize that a theoretical offset value of 192 counts$_{PA}$ corresponds to a full $360^{\circ elect}$ shift. It should further be noted that the calibrations/determinations for the low-resolution sensor transitions are an average of the clockwise and the counterclockwise values. The best-fit line is also a function of both the clockwise and the counterclockwise high-resolution signals. The phase voltage zero crossing is not expected to move based on the rotational direction of the motor. However, if the phase voltage zero crossing does shift based on motor rotational direction, then the average of the clockwise and the counterclockwise values may be used.

Additional naming conventions and definitions that are employed for the algorithms in an exemplary embodiment are depicted in FIG. 12. FIG. 12 shows the above mentioned reference transition. Also represented in the figure are several defined terms associated with the high-resolution position signals. The primary term introduced is that of a slot set. The slot set is the predefined group of four states of the high-resolution sensor traversing $30^{\circ elect}$, where the reference transition will occur. Similar to the LR_State described above, Boolean combination of the two binary state signals yields four possible states. Therefore, a variable indicative of these states is introduced, denoted HR_State, with decimal values 0–3; for the high-resolution position signals, $Q_1$ and $Q_2$ 36. More specifically in an exemplary embodiment: 0 for $Q_1$ and $Q_2$ low; 2 for $Q_1$ low and $Q_2$ high; 3 for $Q_1$ and $Q_2$ high; and 1 for $Q_1$ high and $Q_2$ low. The first high-resolution state in the counterclockwise slot set is termed a Zero Slot and the Zero State Midpoint is therefore, a theoretical location where the abovementioned best-fit line will pass through. It is this midpoint that is the basis for all the offset calculations and calibrations. The leading edge of the zero slot is called the Zero Edge. A slot offset calibration denoted K_Slot_Offset_CCW identifies the distance in counts from a HR_Base edge to the Zero edge. Where the HR_Base edge is defined as the transition of the HR_State from 01 to 00 when rotating in a counterclockwise direction. In an exemplary embodiment phase advance counts (counts$_{PA}$) are used to facilitate the processing. However, it is noteworthy to recognize that the position counter value HR_Count 122, electrical degrees, or another measure may be utilized including combinations including at least one of the foregoing. Another term identified on the figure is the hysteresis offset calibration denoted K_Hyst_Offset_CW, which, is used to address direction of rotation, the effect of hysteresis and the placement of the arbitrary slot set for a given motor sensor based on the end of line calibration process. This calibration allows for maximum flexibility in selecting slot sets during the assembly process since one slot set may be selected for counterclockwise rotation and another selected for clockwise rotation. It is important to appreciate that thus far the definitions provided are for illustrative purposes. Other definitions and nomenclature may be utilized without deviating from the scope of this specification and the claims.

Position Initialization Algorithm

Motor Position Sensor Initialization Levels

Figure 13:
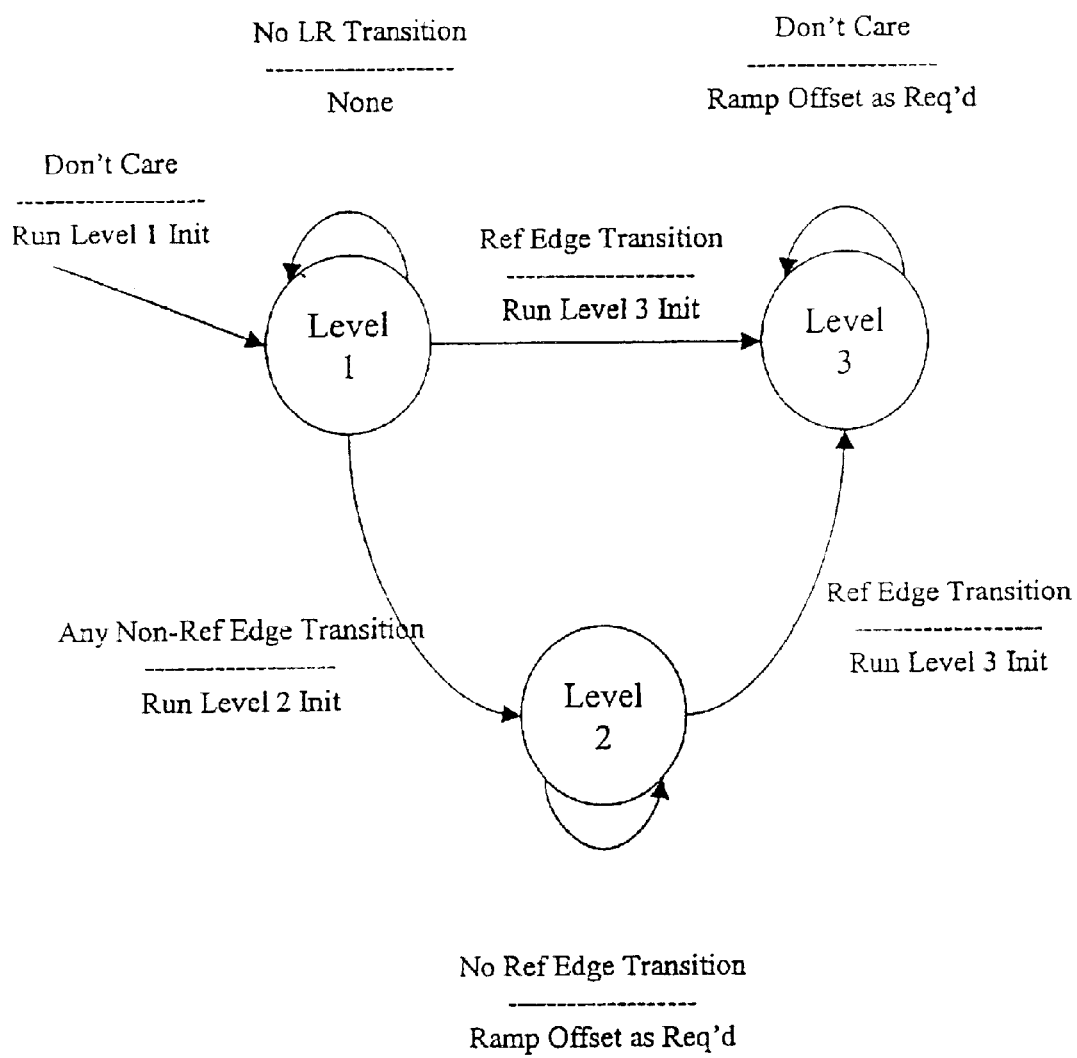
FIG. 13 depicts a state transition diagram for the initialization in an exemplary embodiment.

The generalized algorithm disclosed to initialize the motor position includes three separate initialization levels or states. FIG. 13 depicts a state transition diagram identifying the states and the conditions for transitions between them. Each successive level is progressively utilized as more information becomes available, namely from the computations of previous levels. Each level of initialization utilizes calibration information for the physical construction of the sensor subsystem. It will be appreciated that different configurations of a sensor subsystem could result in various similar calibrations.

The first level initializes the position offset based solely on the back EMF calibration K_Bemf_Cal and the levels (or states) of the three low-resolution position signals 34 $H_a$, $H_b$, and $H_c$. The second level calculates the position offset based on the back EMF calibration K_Bemf_Cal and any of the low-resolution position signal 34 edges. The third level calculates the position offset offset based on K_Bemf_Cal, Captured HR_Count, 122 the captured state of Q1 and Q2, the K_Slot_Set_CCW, K_Hyst_Offset_CW The level 3 initialization is triggered by the reference edge transition.

Figure 14:
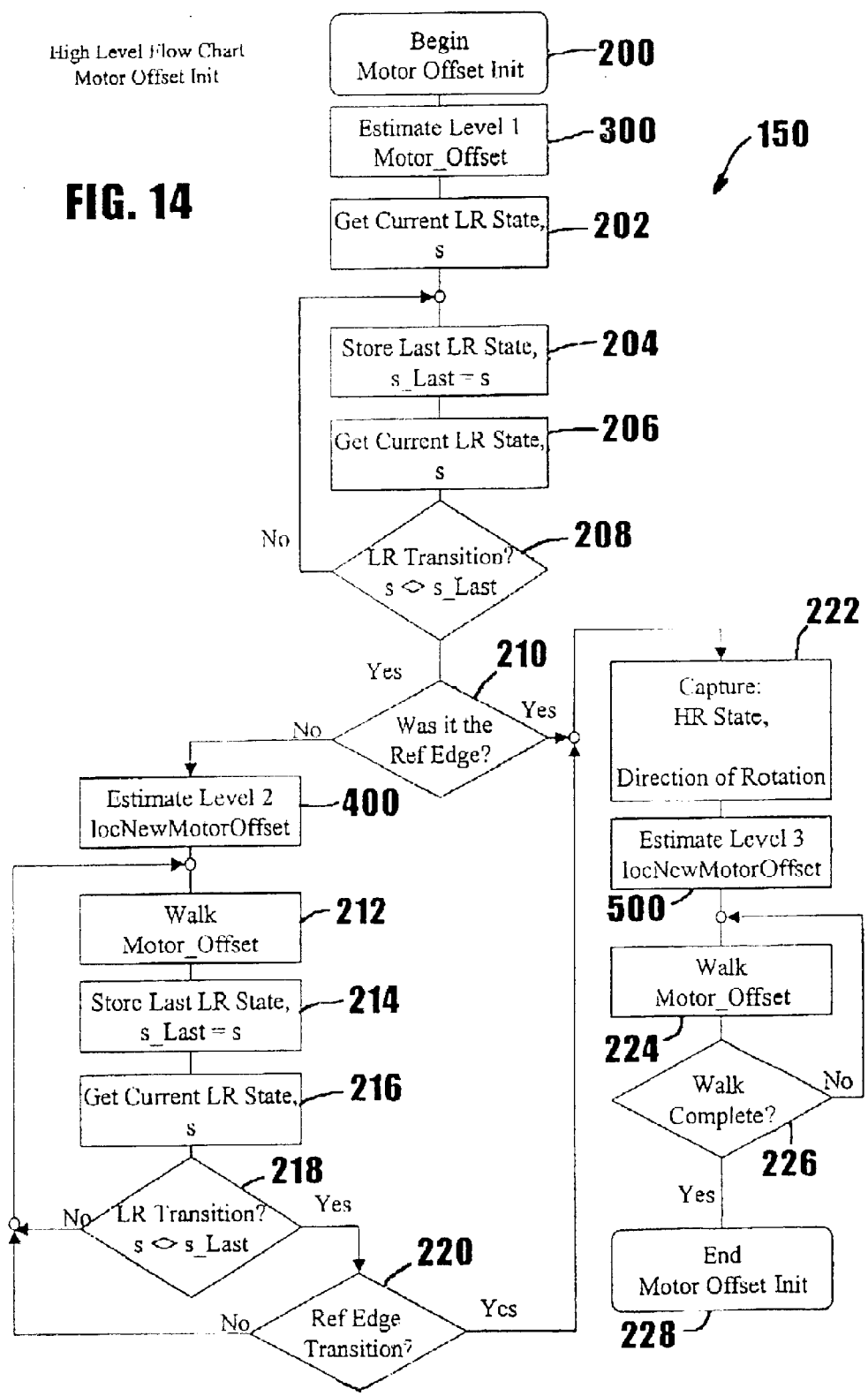
FIG. 14 depicts a top-level implementation flow chart for an exemplary embodiment.

The highest level simplified conceptual flow chart for an exemplary embodiment is shown in FIG. 14. It should be appreciated that the figure depicts a conceptual flow chart, (in a sequential process flow form) and is illustrative only. Moreover, the figure depicts the processes within the initialization functionality only. Therefore it should be understood that the position initialization functions disclosed herein are configured to execute concurrently with other functions and may utilize and supply information, signals, values, and the like including combinations of the foregoing to other processes and functions not the subject of this disclosure.

Turning now to FIG. 14, a high level flow chart of the initialization algorithm 150 is provided. The processes are initiated at application of power or reset of system functions as depicted at 200. The first level initialization is completed at 300. The Level 1 initialization 300 determines the offset based upon the state of the low-resolution position signals 34 $H_a$, $H_b$, and $H_c$. Secondly, following the Level 1 initialization 300, the initialization algorithm 150 transitions to a Level 2 initialization 400 on the next transition of a LR_State. Processes 202, 204, 206, and 208 cooperate to ascertain the LR_State and identify the transition to the next LR_State as depicted at decision block 208. Moreover, if the transition also turns out to be a reference edge (e.g., LR_State 1 to LR_State 5 or vice versa) as depicted in decision block 210, then the initialization algorithm 150 transitions to process 222 to initiate a Level 3 initialization 500.

The Level 2 initialization 400 computes a motor offset estimate based on more accurate measurement data for the motor offset relative to a selected LR_State transition. Following Level 2 initialization 400 the current offset value Motor_Offset 152 (FIG. 9) is corrected to the newly calculated offset value via a migration function denoted Walk Motor_Offset as depicted at 212. Once again Processes 214, 216, 218, and 220 cooperate to ascertain the LR_State, identify the transition to the next LR_State, and identify the reference edge transition as depicted at decision block 220. Following the Level 2 initialization, the adjustment of Motor_Offset 152, and upon detection of the next reference edge, the initialization algorithm 150 transitions to process 222 to initiate Level 3 initialization 500. Process 222 includes capturing the current high-resolution state HR_State, the value of the position counter HR_Count, and ascertains the direction of rotation for motor 12. In an exemplary embodiment, the direction of rotation is determined by evaluating the LR_State transitions to ascertain the current low-resolution state and the previous low-resolution state. With this information, the direction of rotation may be determined. It will be appreciated, that there exist numerous methodologies for determining the direction of rotation, and the exemplary embodiment is intended to be illustrative thereof.

The Level 3 initialization 500 computes a more accurate value for the motor offset based upon high-resolution state, the position counter, the low-resolution reference edge, the direction of rotation, and the motor calibrations. Once again, following the Level 3 initialization 500, a Walk Motor_Offset function 224 migrates the existing offset value Motor_Offset 152 (FIG. 9) to the resultant new value computed during Level 3 initialization 500. Upon completion of the Walk Motor_Offset 224 the initialization is complete, as depicted by decision block 226 and end process 228.

Table 1 is a data dictionary defining the measurements and parameters utilized in FIG. 11 and utilized for execution of the initialization algorithm 150. The distances identified in the table are given in binary counts, but it should be apparent that other units are possible and that the engineering units selected for such measurements is somewhat arbitrary. It should be noted that not all entries in the data dictionary are employed in each level of initialization, for example, those marked with an asterisk (*) are employed only in Level 3 initialization 500.

TABLE 1

Initialization Data Dictionary

| Name | Description | Source | Value Range |
|---|---|---|---|
| Input Signal(s) | | | |
| Ha, Hb, Hc | Low-resolution Sensor State | Motor LR Hall Sensor Signals | 1, 2, 3, 4, 5, 6 |
| HR_COUNT Position Counter | Measured relative position of the motor | Quadrature Counter | 0–191 |
| Unit Calibration(s) | | | |
| K_Bemf_Cal | Distance between Zero Midpoint and $V_{ab}$ emf | EOL Calibration | 0–191 |
| K_LR_EDGE_1_5 | Distance from Zero Midpoint to the LR 1_5 edge | EOL Calibration | 0–191 |
| K_LR_EDGE_5_4 | Distance from the Zero Midpoint to the LR 5_4 edge | EOL Calibration | 0–191 |
| K_LR_EDGE_4_6 | Distance from the Zero Midpoint to the LR 4_6 edge | EOL Calibration | 0–191 |
| K_LR_EDGE_6_2 | Distance from the Zero Midpoint to the LR 6_2 edge | EOL Calibration | 0–191 |
| K_LR_EDGE_2_3 | Distance from the Zero Midpoint to the LR 2_3 edge | EOL Calibration | 0–191 |
| K_LR_EDGE_3_1 | Distance from the Zero Midpoint to the LR 3_1 edge | EOL Calibration | 0–191 |
| PC_C* | Measured relative position of the motor, Captured at reference edge transition | Quadrature counter | 0–191 |
| $Q_1$_C*, $Q_2$_C* | $Q_1$ & $Q_2$, Captured at reference edge transition | Motor HR Hall Sensor Signals | 00, 01, 11, 10 |
| K_Slot_Set_CCW* | Slot set calibration value for CCW rotation | EOL Calibration | 0, 4, 8, 12 |
| K_Hyst_Offset_CW* | Slot set offset for CW rotation, distance from CCW slot set start to CW slot set | EOL Calibration | 0, 4, 8, 12 |

TABLE 1-continued

Initialization Data Dictionary

| Name | Description | Source | Value Range |
|---|---|---|---|
| | Output(s) | | |
| Motor_Offset | Difference between the position counter and $V_{ab}$ emf | Initialization routine | 0–191 |

Level 1 Initialization

Turning now to the functional detail of the Level 1 initialization, the Level 1 initialization technique utilized may also be referred to as a "Calibrated Low-resolution L1 Initialization". It is noteworthy to appreciate that an exemplary embodiment as disclosed is but one of various methods of executing a Level 1 initialization. With the disclosed method, an offset is calculated as the distance between the current numerical representation of the position sensor and an arbitrarily defined motor's back emf zero reference point. More particularly, an offset is calculated as the distance of two legs. First, the distance between the motor's back emf and the sensor's zero, and second, the distance between the sensor's zero and the high resolution motor position counter (initializes to a different value (location) with each initial operational cycle (e.g., on each ignition cycle). The offset between the current numerical representation of the position sensor and the arbitrarily defined motor's emf zero. The offset is determined based upon the state of the low-resolution position signals 34 $H_a$, $H_b$, and $H_c$. The estimate is also based on the calibration values for the low-resolution sensor edges. Simply stated, the motor position is estimated to be substantially in the middle of a low-resolution state as defined by the low-resolution state's edge calibration (e.g., K_LR_EDGE_5_4−K_LR_EDGE_1_5)/2+K_LR_EDGE_1_5)

Figure 15:
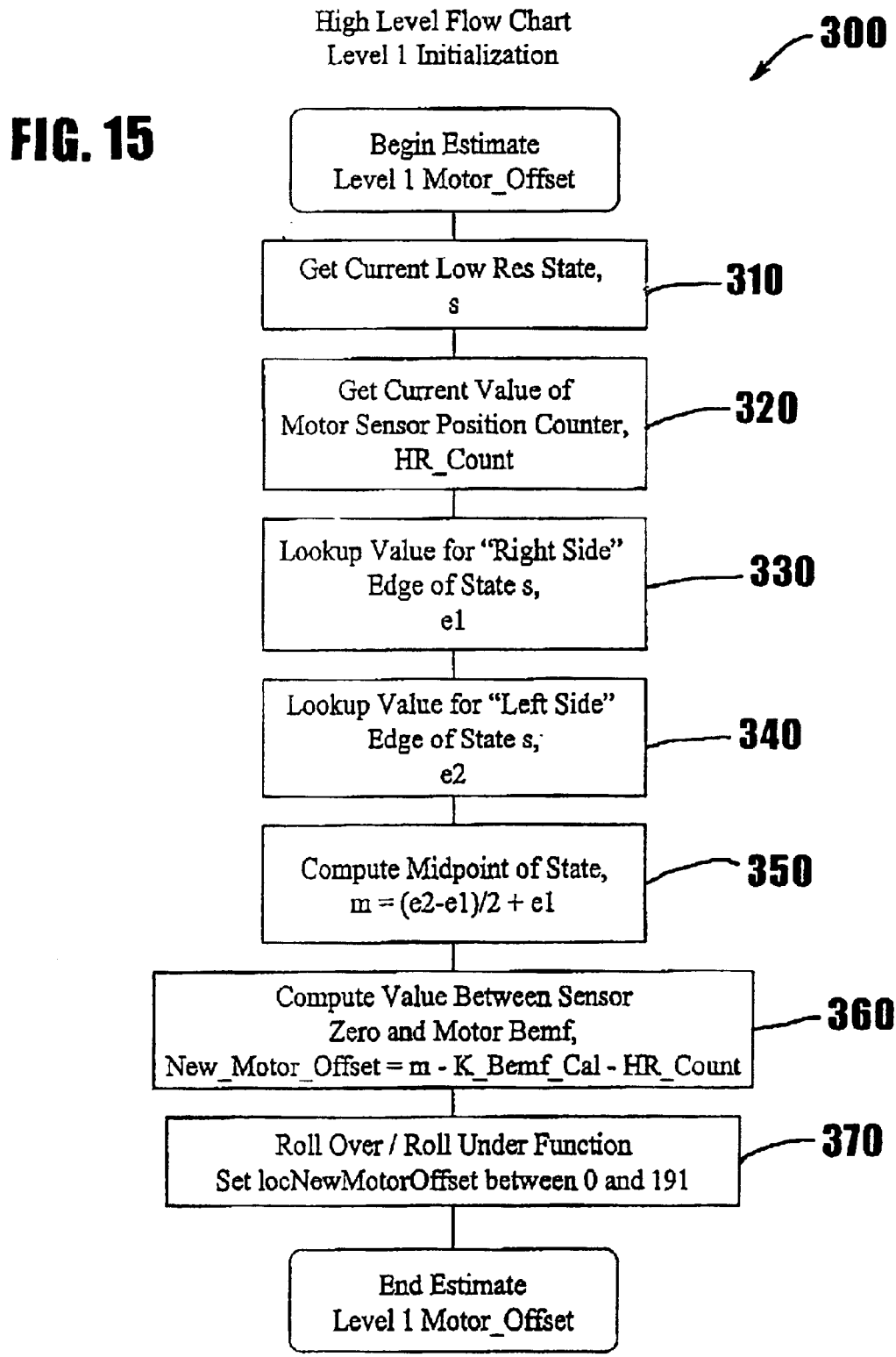
FIG. 15 depicts a flow chart for a Level 1 initialization implementation of an exemplary embodiment.

FIG. 15 depicts a flow diagram of an exemplary implementation of the Level 1 initialization 300. The Level 1 initialization 300 process as may be executed by controller 18 comprises a routine of measurements and computations to estimate a motor offset relative to the zero value of HR_Count. This offset is estimated based on the midpoint (or center) of the low-resolution state. To compute the low-resolution state midpoint and relevant measurements thereto, the Level 1 initialization 300 starts with sampling or capturing the current low-resolution state, LR_State as depicted at process 310 and the current value of the motor position as depicted at process 320. With the LR_State and the current motor position, a position value associated with a first edge, (e.g., the right edge) of the low-resolution state may be ascertained as depicted at process 330. Thereafter, process 340 depicts determining a position value associated with a second edge, (e.g., the left edge) of the low-resolution state. Process 350 depicts the computation of the low resolution state midpoint denoted m as follows in equation (1):

$$m=(e2-e1)/2+e1 \quad (1)$$

At process 360 a first estimate of the motor offset is computed in accordance with the following equation:

$$\text{New\_Motor\_Offset}=m-\text{K\_Bemf\_Cal}-\text{HR\_Count} \quad (2)$$

Finally, at process 370, a roll over/roll under function is employed to address numerical range considerations typically associated with numerical methodologies and digital computing.

With a new motor offset computed the Level 1 initialization 300 is complete and the initialization algorithm 150 is ready to transition to Level 2 initialization 400 or Level 3 initialization 500. As stated earlier, following the Level 1 initialization 300, the initialization algorithm 150 transitions to a Level 2 initialization 400 on the next transition of a LR_State as depicted at decision block 208 (FIG. 14). Moreover, if the transition also turns out to be a reference edge (e.g., LR_State 1 to LR_State 5 or vice versa) then the initialization algorithm 150 transition directly to a Level 3 initialization 500 as depicted in decision block 210 (FIG. 14).

Figure 16:
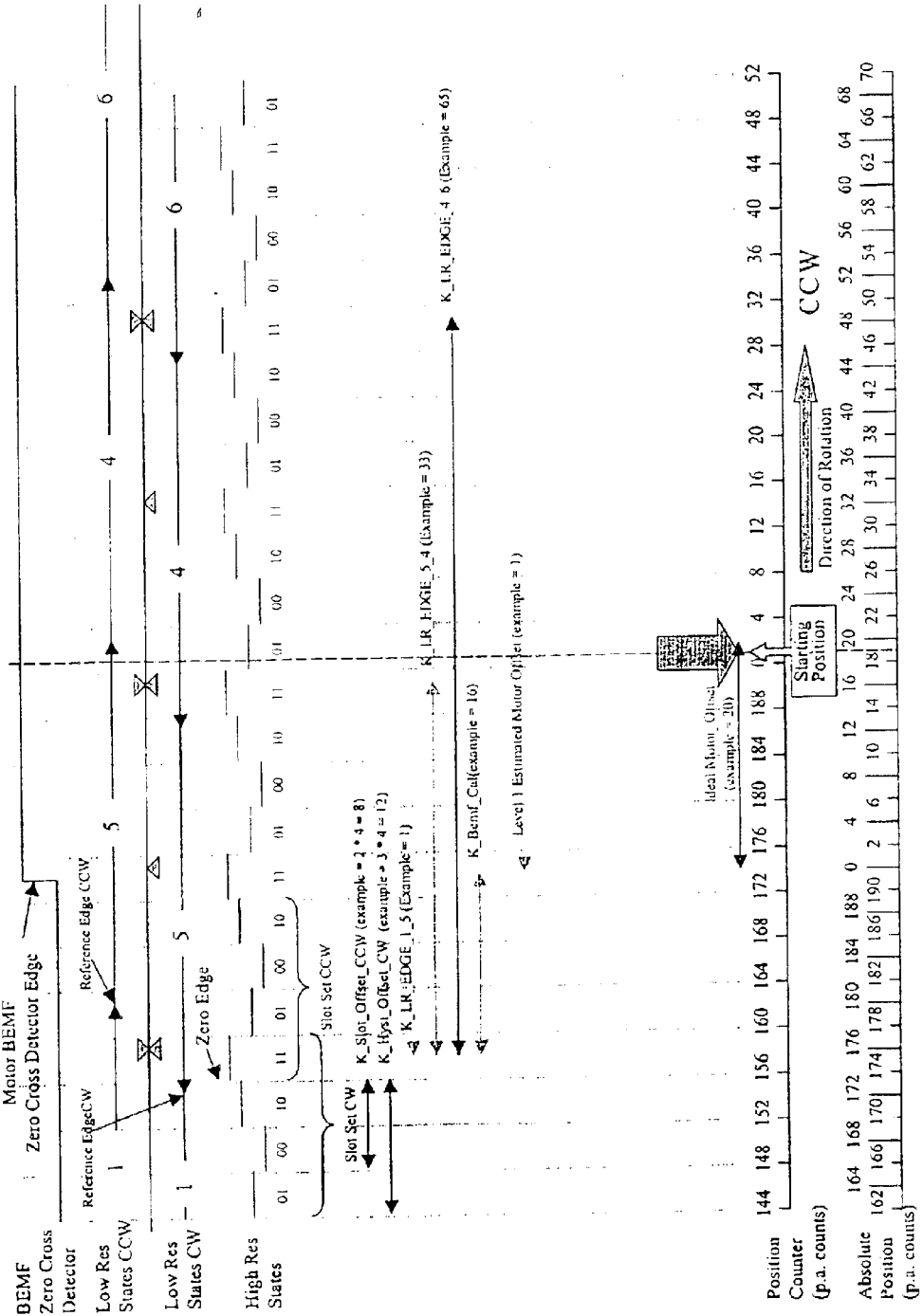
FIG. 16 depicts an illustrative Level 1 CCW initialization example.

FIG. 16 is a diagram depicting a hypothetical example of a level 1 counterclockwise (CCW) initialization. Using the algorithm given in the previous section and the following example values, the algorithm calculations are outlined below for a counterclockwise level 1 initialization.

TABLE 2

Level 1 CCW Example Values

| Variable | Value at Event |
|---|---|
| HR_Count | 0 counts$_{PA}$ |
| LR_State | 5 (101B) |
| K_Bemf_Cal | 16 counts$_{PA}$ |
| K_LR_EDGE_1_5 | 1 counts$_{PA}$ |
| K_LR_EDGE_5_4 | 33 counts$_{PA}$ |
| K_LR_EDGE_4_6 | 65 counts$_{PA}$ |
| K_LR_EDGE_6_2 | 97 counts$_{PA}$ |
| K_LR_EDGE_2_3 | 129 counts$_{PA}$ |
| K_LR_EDGE_3_1 | 161 counts$_{PA}$ | e1=K_LR_EDGE_1_5=1
e2=K_LR_EDGE_5_4=33
m=(e2−e1)/2+e1=(33−1)/2+1=17
New_Motor_Offset=m−K_Bemf_Cal−HR_Count= 17−16−0=1
Roll Over/Roll Under Correction (0 to 191)
New_Motor_Offset=1

Level 2 Initialization

The Level 2 initialization technique utilized is also referred to as "Calibrated Low-resolution L2 Initialization". Once, disclose herein is one of numerous methods of Level 2 initialization 400. In an exemplary embodiment of Level 2 initialization 400 the motor position is estimated based upon the state transition of the low-resolution position signals 34, LR_State and a calibration value for the low-resolution state transition edge. That is, in an exemplary embodiment, the motor position is estimated from the transition point of the low-resolution state as defined by the low-resolution state's edge calibration.

Figure 17:
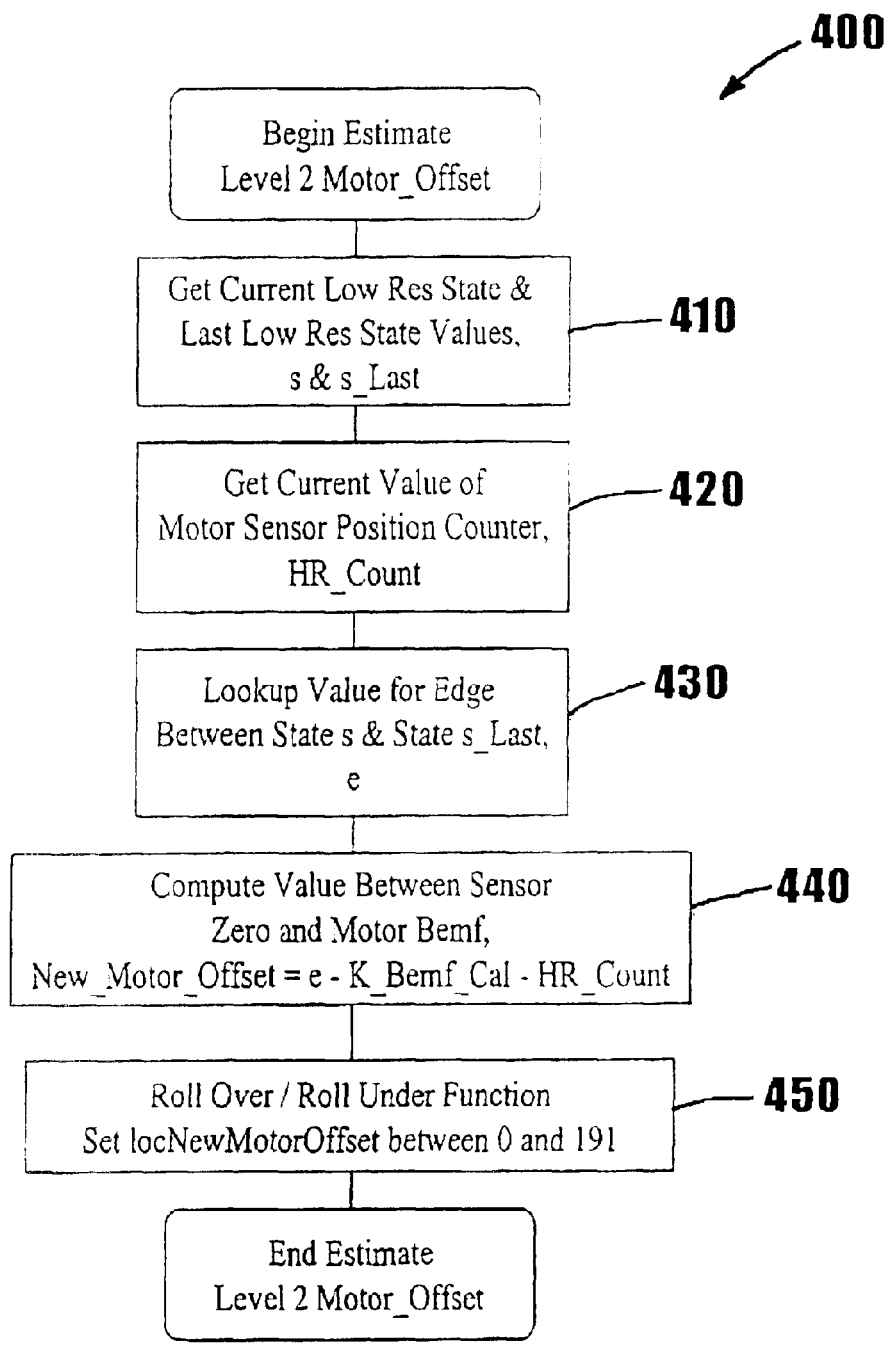
FIG. 17 depicts a flow chart for a Level 2 initialization implementation of an exemplary embodiment.

FIG. 17 depicts a flow diagram of an exemplary implementation of the Level 2 initialization 400. The Level 2 initialization 400 process as may be executed by controller 18 comprises a routine of measurements and computations to estimate a motor offset relative to the edge of a low-resolution state. It is noteworthy to appreciate that any edge of a low-resolution state (other than the edge corresponding to LR_STATE 1 to LR_STATE 5 or vice versa) will result in a transition to Level 2 initialization. To compute the Motor_Offset and relevant measurements thereto, the Level 2 initialization 400 starts with acquiring the current and last low-resolution state(s), LR_State as depicted at process 410. Process 420 comprises obtaining a current value of the motor position counter HR_COUNT 122 from the position counter 120.

The value of the edge denoted e corresponding to the transition from the previous low-resolution state LR_State and the current LR_State is determined at process 430. With a position value corresponding to the low-resolution state transition of interest, at process 440 the computation of a second estimate/correction for the motor offset is computed in accordance with the following equation:

$$\text{New\_Motor\_Offset} = e - K\_Bemf\_Cal - HR\_Count \quad (3)$$

Finally, at process 450, a roll over/roll under function is employed to address numerical range considerations typically associated with numerical methodologies and digital computing.

With a position value New_Motor_Offset corresponding to the new motor offset computed for either the clockwise or counterclockwise rotation, at process 450 the value is corrected to account for mathematical processing and address signal value over/under flow, and thereby, limiting the range to between 0 and 191 counts (inclusive) yielding a final New_Motor_Offset value for the Level 2 initialization. It is noteworthy to recognize that the function employed at process 450 is typical of numerical methodologies employed for value overflow/roll over in signal processing and computing. It is noted here to clarify the application to the motor position offset algorithms disclosed.

Figure 18:
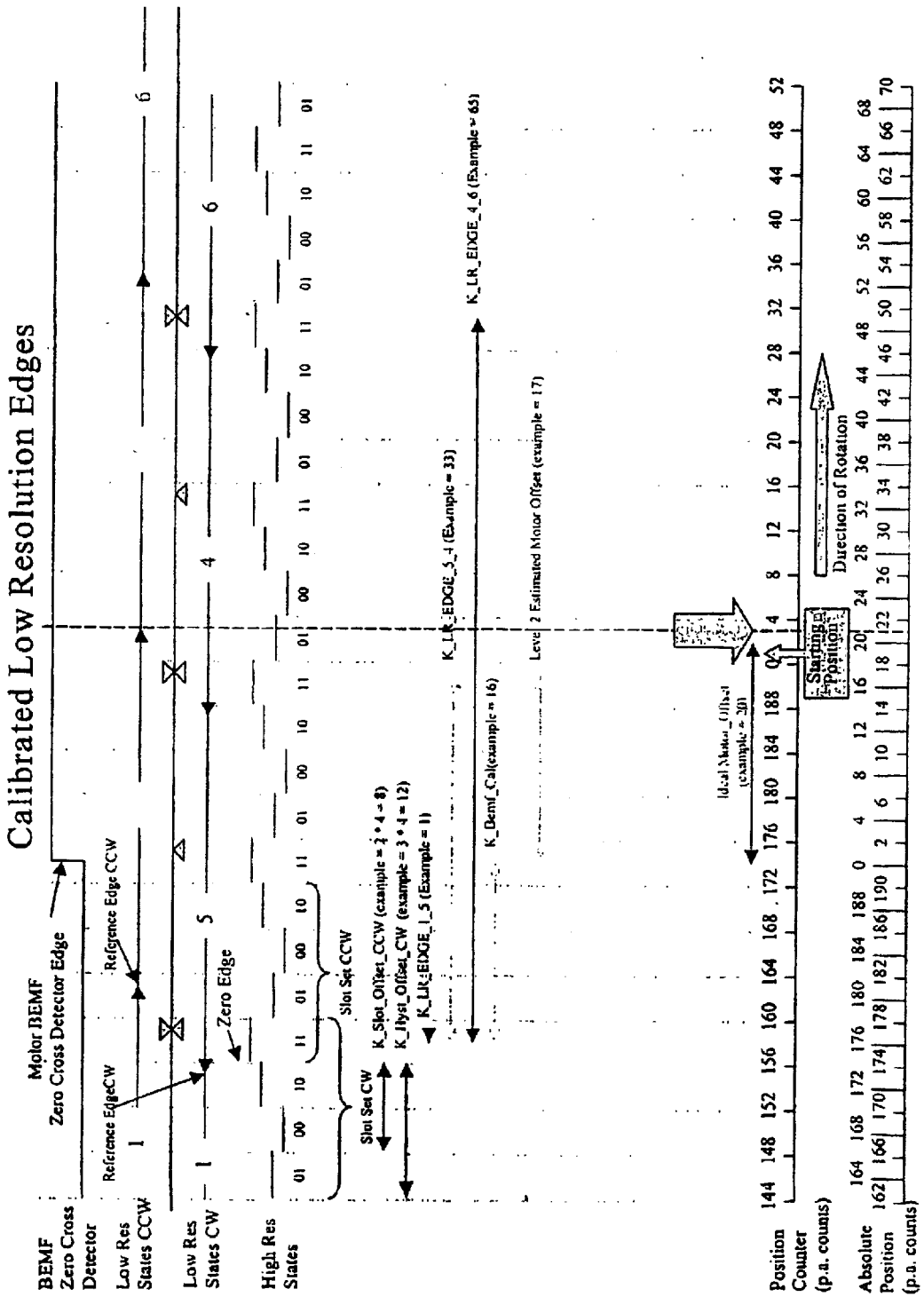
FIG. 18 depicts an illustrative Level 2 CCW initialization example.

FIG. 18 depicts an exemplary Level 2 CCW initialization. Using the algorithm given in the previous section and the following example values, the algorithm calculations are outlined below for the counterclockwise Level 2 initialization 400.

TABLE 3

Level 2 CCW Example Values

| Variable | Value at Event |
| --- | --- |
| HR_Count | 0 counts$_{PA}$ |
| LR_State | 5 (101B) to 4 (100B) |
| K_Bemf_Cal | 16 counts$_{PA}$ |
| K_LR_EDGE_1_5 | 1 counts$_{PA}$ |
| K_LR_EDGE_5_4 | 33 counts$_{PA}$ |
| K_LR_EDGE_4_6 | 65 counts$_{PA}$ |
| K_LR_EDGE_6_2 | 97 counts$_{PA}$ |
| K_LR_EDGE_2_3 | 129 counts$_{PA}$ |
| K_LR_EDGE_3_1 | 161 counts$_{PA}$ |

Since the LR_State transitioned from 5 to 4 the motor is rotating counterclockwise:

e=K_LR_EDGE_5_4=33

New_Motor_Offset=e-K_Bemf_Cal-HR_Count= 33-16-0=17

Roll Over/Roll Under Correction (0 to 191)

New_Motor_Offset=17

Figure 19:
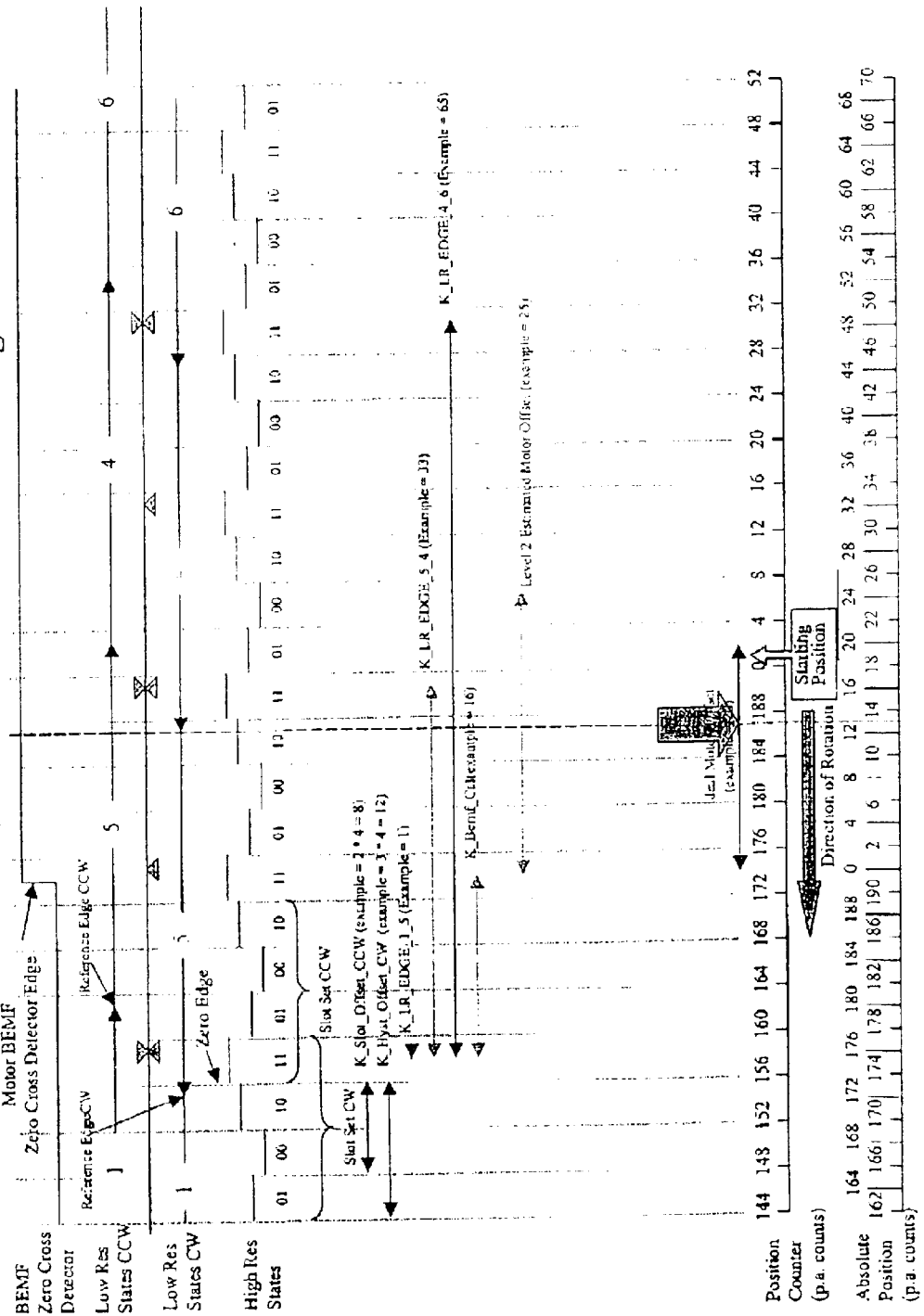
FIG. 19 depicts an illustrative Level 2 CW initialization example.

FIG. 19 depicts an exemplary Level 2 CW initialization. Using the algorithm given in the previous section and the following example values, the algorithm calculations are outlined below for a clockwise Level 2 initialization 400.

TABLE 4

| Variable | Value at Event |
| --- | --- |
| HR_Count | 184 counts$_{PA}$ |
| LR_State | 4 (101B) to 5 (100B) |
| K_Bemf_Cal | 16 counts$_{PA}$ |
| K_LR_EDGE_1_5 | 1 counts$_{PA}$ |
| K_LR_EDGE_5_4 | 33 counts$_{PA}$ |
| K_LR_EDGE_4_6 | 65 counts$_{PA}$ |
| K_LR_EDGE_6_2 | 97 counts$_{PA}$ |
| K_LR_EDGE_2_3 | 129 counts$_{PA}$ |
| K_LR_EDGE_3_1 | 161 counts$_{PA}$ |

Since the LR_State transitioned from 4 to 5 the motor is rotating counterclockwise:

e=K_LR_EDGE_5_4=33

New_Motor_Offset=e-K_Bemf_Cal-HR_Count= 33-16-184=-167

Roll Over/Roll Under Correction (0 to 191)

New_Motor_Offset=-167+192=25

Figure 20:
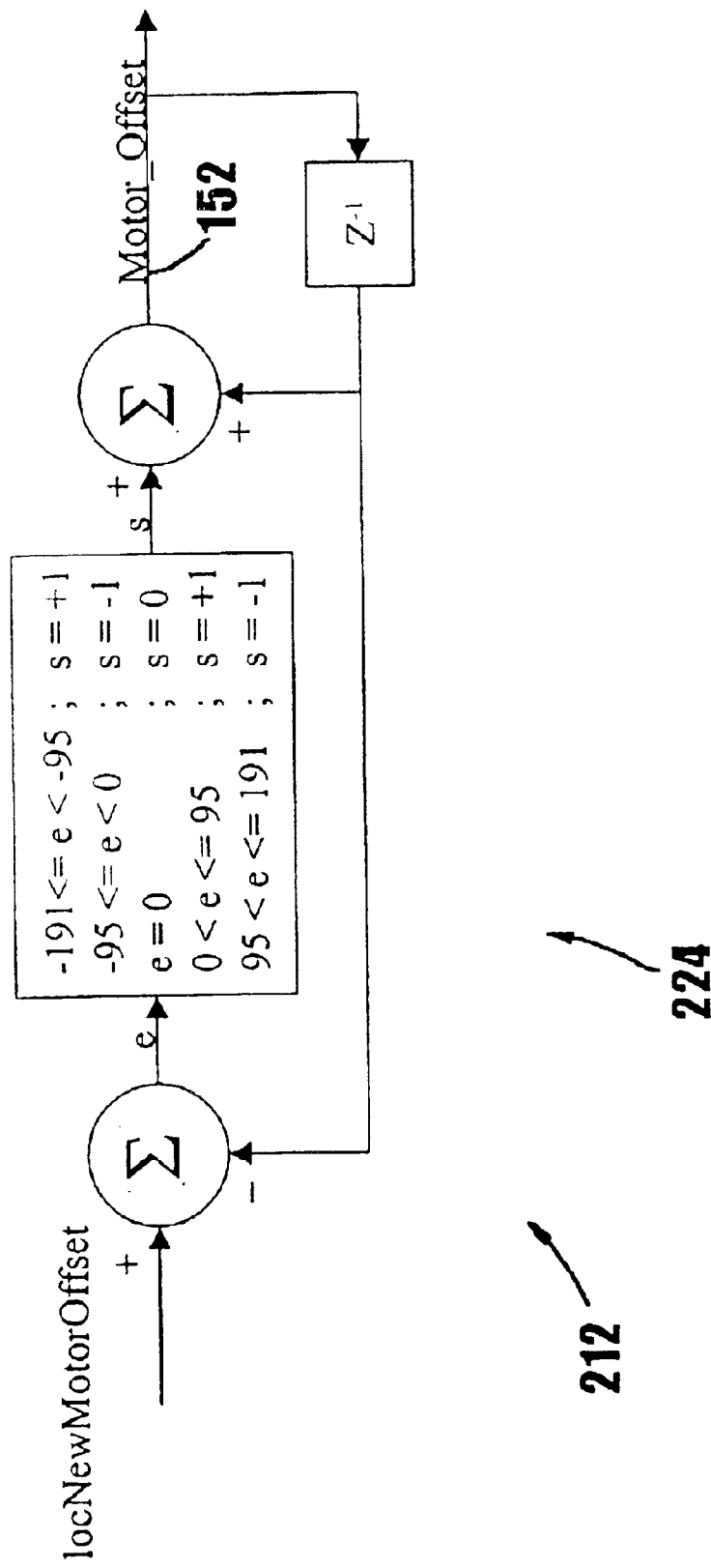
FIG. 20 depicts an exemplary motor position walk function.

Returning to FIG. 14, with a new motor offset computed, the Level 2 initialization 400 is complete and the initialization algorithm 150 is ready to adjust the current value of the motor offset Motor_Offset. To facilitate correction of the value Motor_Offset, in an exemplary embodiment, an offset compensation algorithm is introduced denoted Walk Motor_Offset process 212 (FIG. 14). The Walk Motor_Offset 212 is a process whereby the existing value for motor offset Motor_Offset 152 (e.g., from the Level 1 initialization 300) is migrated to achieve the newly determined value for the motor offset as a function (in this instance) of the Level 2 initialization 400. The function shown in FIG. 20 provides a time based walk, which can be adjusted based on the calling frequency. It should be appreciated that such a function may be implemented in a variety of ways. The exemplary embodiment includes a time based walk algorithm in that it facilitates processing and implementation. Alternative embodiments may employ implementations such as magnitude based fixed increment, variable increment magnitude based, time and magnitude based, and the like including combinations including at least one of the foregoing.

The Walk Motor_Offset 212 process continues for each cycle of controller 18 through the initialization algorithm 150 until the walk is complete (the target value has been achieved). Upon the next transition of the LR_State, once again in a manner similar to that disclosed earlier, processes 214, 216, and 218 cooperate to ascertain the LR_State, identify the transition to the next LR_State, and identify the reference edge transition (e.g., LR_State 1 to LR_State 5 or vice versa) as depicted at decision block 220 (FIG. 14). Upon detection of a reference edge as depicted at decision block 220, the initialization algorithm 150 transitions to process 222 to initiate Level 3 initialization 500. Process 222 includes capturing the current high-resolution state HR_State, the value of the position counter HR_Count, and ascertains the direction of rotation for motor 12. In an exemplary embodiment, the direction of rotation is determined by evaluating the LR_State transitions to ascertain the current low-resolution state and the previous low-resolution state. With this information the direction of rotation may be determined. It will be appreciated, that there exist numerous methodologies for determining the direction of rotation, and the exemplary embodiment is intended to be illustrative thereof.

Level 3 Initialization

The Level 3 initialization technique utilized is also referred to as "Bi-directional, High-Resolution Edge Offset, Calibratable Slot set". It should be noted that the disclosed exemplary embodiment is one of numerous methods of implementing and accomplishing a Level 3 initialization 500 and therefore should be considered illustrative and not limiting. In an exemplary embodiment of a Level 3 initialization 500 process, the motor position is calculated based upon the zero edge of the high-resolution sensor. The zero edge is identified by the reference state transition of the low-resolution position signals 34 (e.g., LR_State 1 to LR_State 5 or vice versa). The calculation also employs direction of rotation in order to allow for increased motor position sensor tolerances and hysteresis induced variances in relative angular relationships of the sensor signals, e.g., the low resolution position signals $H_a$ 34a, $H_b$ 34b, and $H_c$ 34c respectively. It should be noted that Level 3 initialization 500 is relative to the high-resolution position only. The low-resolution sensor is simply used to find the right high-resolution edge. Therefore, it should be understood, that alternative embodiments may be conceived of, which may employ less than three low-resolution position sensors. Such an alternative embodiment may include a single signal for a reference edge and the high-resolution position signals, Q1 and Q2 36.

Figure 21:
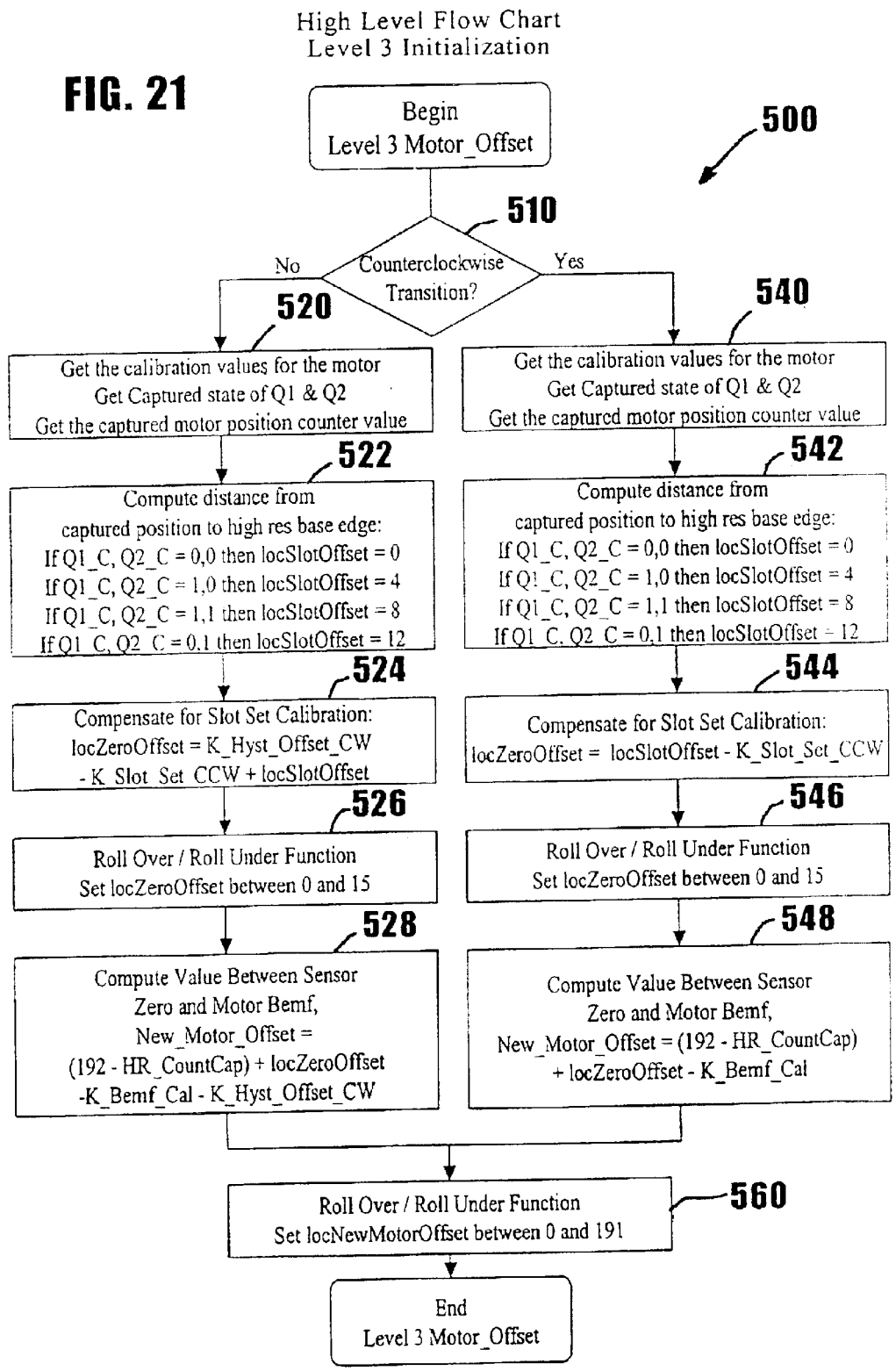
FIG. 21 depicts a flow chart for a Level 3 initialization implementation of an exemplary embodiment.

FIG. 21 depicts an implementation flow chart of exemplary embodiment of a Level 3 initialization 500. The Level 3 initialization 500 process as may be executed by controller 18 comprises a routine of measurements and computations to estimate a motor offset relative to the zero edge of a high-resolution state HR_State. To compute the relevant measurements thereto, the Level 3 initialization 500 initiates with determination of the direction of rotation for the motor 12. Once, again, in an exemplary embodiment, the determination is made by acquiring the current low-resolution state(s), LR_State, and the last low-resolution state. The direction of rotation may readily be determined as the sequence and order of the low-resolution states is predetermined. In fact, because a reference edge transition triggered the transition to process 222 (FIG. 14) and Level 3 initialization 500, knowledge of the current low-resolution state LR_State is all that is needed. It should be noted that because a reference edge is defined as the transition between LR_State 1 to LR_State 5 or vice versa, and if the current low-resolution state LR_State is state 1 and a reference edge transition has occurred for example, then the previous must have been LR_State 5 and therefore the direction of rotation is clockwise. Similarly, if the current LR_State is 5 and a reference edge transition has occurred, then the previous must have been LR_State 1 and therefore the direction of rotation is counterclockwise. Upon determination of direction, the Level 3 initialization 500 divides for computation of the Motor_Offset 152 with consideration of direction. Processes 520, 522, 524, and 526 address the clockwise rotation of the motor 12. While processes 540, 542, 544, and 546 address the counterclockwise rotation of the motor 12. At decision block 510 the direction of rotation is employed to ascertain if the motor 12 is rotating counterclockwise. If so, the processing branches to process 540 if not, the process transitions to process 520.

Turning to the processing for the clockwise direction, at process 520 the desired values for the motor calibrations are acquired to facilitate the process of computing the motor offset. A value for an offset corresponding to the states of the high-resolution signals Q1 and Q2 with respect to the zero slot edge is computed. Finally, a captured value of the position counter HR_Count 122 is acquired to facilitate the process of computing the motor offset 152.

In an exemplary embodiment at process 522, based upon the state of the high-resolution signals Q1 and Q2 a local slot offset is ascertained. The local slot offset denoted locSlot_Offset corresponds to a calibrated distance for the difference between the base high-resolution sensor state HR_State 00 or 0 and the captured HR_State in which the reference edge occurs. The value for locSlot_Offset can be determined from Table 6.

TABLE 6

| LocSlot_Offset Slot_Offset_Table | | |
|---|---|---|
| Q1_C | Q2_C | LocSlot_Offset |
| 0 | 0 | 0 |
| 1 | 0 | 4 |
| 1 | 1 | 8 |
| 0 | 1 | 12 |

In an exemplary embodiment at process 524, the local (implying internal to Level 3 initialization) zero offset denoted hereinafter as LocZeroOffset is computed as follows:

LocZeroOffset=K_Hyst_Offset_CW−K_Slot_Set_CCW+ locSlot_Offset where the K_Hyst_Offset_CW corresponds to the offset calibration to account for the relative effect of hysteresis on the low resolution position sensors with respect to the high resolution position sensors, the calibration K_Slot_Set_CCW corresponds to the distance between the HR_Base edge and the zero edge, and the locSlot_Offset corresponds to a calibrated distance for the difference between the base high-resolution sensor state HR_State 00 or 0 and the captured HR_State in which the reference edge occurs.

At process 526, a roll over/roll under function is employed to address numerical range considerations typically associated with numerical methodologies and digital computing. Finally, the motor offset as part of the Level 3 initialization 500 may now be readily computed. Process 528 depicts the computation of the motor offset as follows New_Motor_Offset=(192−HR_Countcap)+LocZeroOffset− K_Bemf_Cal−K_Hyst_Offset_CW Turning to the processing for the counterclockwise direction, at process 540 the desired values for the motor calibrations are acquired to facilitate the process of computing the motor offset 152. Similar to process 522, at process 542 a local slot offset denoted locSlot_Offset is ascertained. Once again, the value for locSlot_Offset can be determined from Table 6. In an exemplary embodiment at process 544, a local zero offset denoted hereinafter as LocZeroOffset is computed as follows:

LocZeroOffset=locSlot_Offset−K_Slot_Set_CCW where the calibration K_Slot_Set_CCW corresponds to the distance between the HR Base edge and the zero edge, and the locSlot_Offset corresponds to a calibrated distance for the difference between the base high-resolution sensor state HR_State 00 or 0 and the captured HR_State in which the reference edge occurs.

At process 546, once again, a roll over/roll under function is employed to address numerical range considerations typically associated with numerical methodologies and digital computing. The motor offset as part of the Level 3 initialization 500 may now be readily computed. Process 546 depicts the computation of the motor offset as follows New_Motor_Offset=(192−HR_Count)+locZeroOffset−K_Slot_Set_CCW−K_Bemf_Cal With a position value New_Motor_Offset corresponding to the new motor offset computed for either the clockwise or counterclockwise rotation, at process 560 the value is corrected to account for mathematical processing and address signal value over/under flow, and thereby, limiting the range to between 0 and 191 counts yielding a final New_Motor_Offset value for the Level 3 initialization. It is noteworthy to recognize that the function employed at process 560 is typical of numerical methodologies employed for value overflow/roll over in signal processing and computing. It is noted here to clarify the application to the motor position offset algorithms disclosed.

Figure 22:
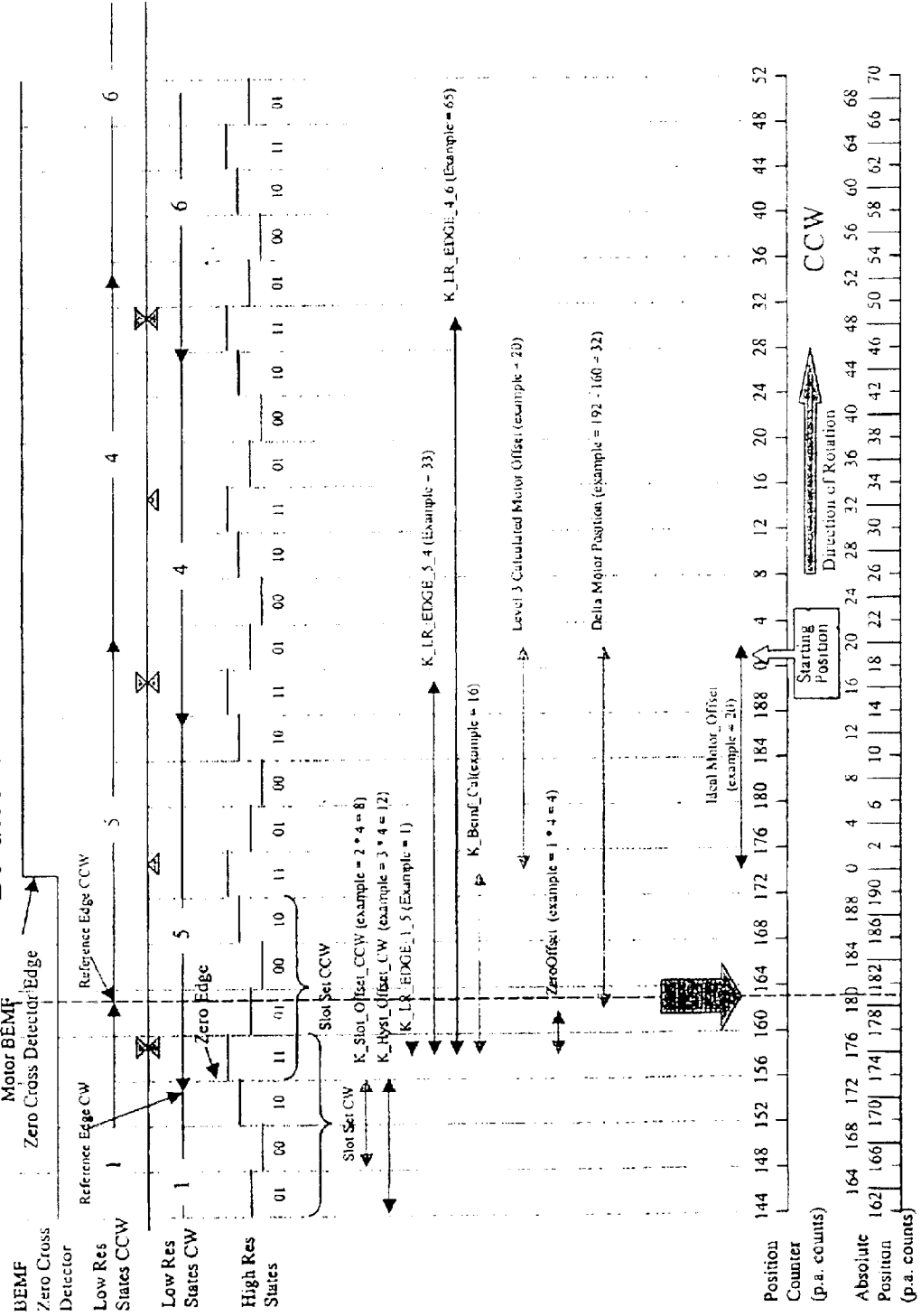
FIG. 22 depicts an illustrative Level 3 CCW initialization example.

FIG. 22 depicts an exemplary Level 3 CCW initialization. Using the algorithm given in the previous section and the following example values, the algorithm calculations are outlined below for the counterclockwise Level 3 example.

TABLE 7

Level 3 CCW Example Values

| Variable | Value at Event |
|---|---|
| HR_CountCap | 160 counts$_{PA}$ |
| LR_State | 5 (101B) to 4 (100B) |
| Q$_1$_Captured, Q$_2$_Captured | 0, 1 |
| K_Bemf_Cal | 16 counts$_{PA}$ |
| K_LR_EDGE_1_5 | 1 counts$_{PA}$ |
| K_LR_EDGE_5_4 | 33 counts$_{PA}$ |
| K_LR_EDGE_4_6 | 65 counts$_{PA}$ |
| K_LR_EDGE_6_2 | 97 counts$_{PA}$ |
| K_LR_EDGE_2_3 | 129 counts$_{PA}$ |
| K_LR_EDGE_3_1 | 161 counts$_{PA}$ |
| K_Slot_Set_CCW | 8 counts$_{PA}$ |
| K_Hyst_Offset_CW | 12 counts$_{PA}$ |

Since the LR_State=5 the transition was counterclockwise:

locSlotOffset=12 locZeroOffset=locSlotOffset−K_Slot_Set_CCW= 12−8=4

Roll Over/Roll Under Correction (0 to 15)

locZeroOffset=4

New_Motor_Offset =

(192 − HR_CountCap) + locZeroOffset − K_Bemf_Cal =

(192 − 160) + 4 − 16 = 20

Roll Over/Roll Under Correction (0 to 191)

New_Motor_Offset=20

Figure 23:
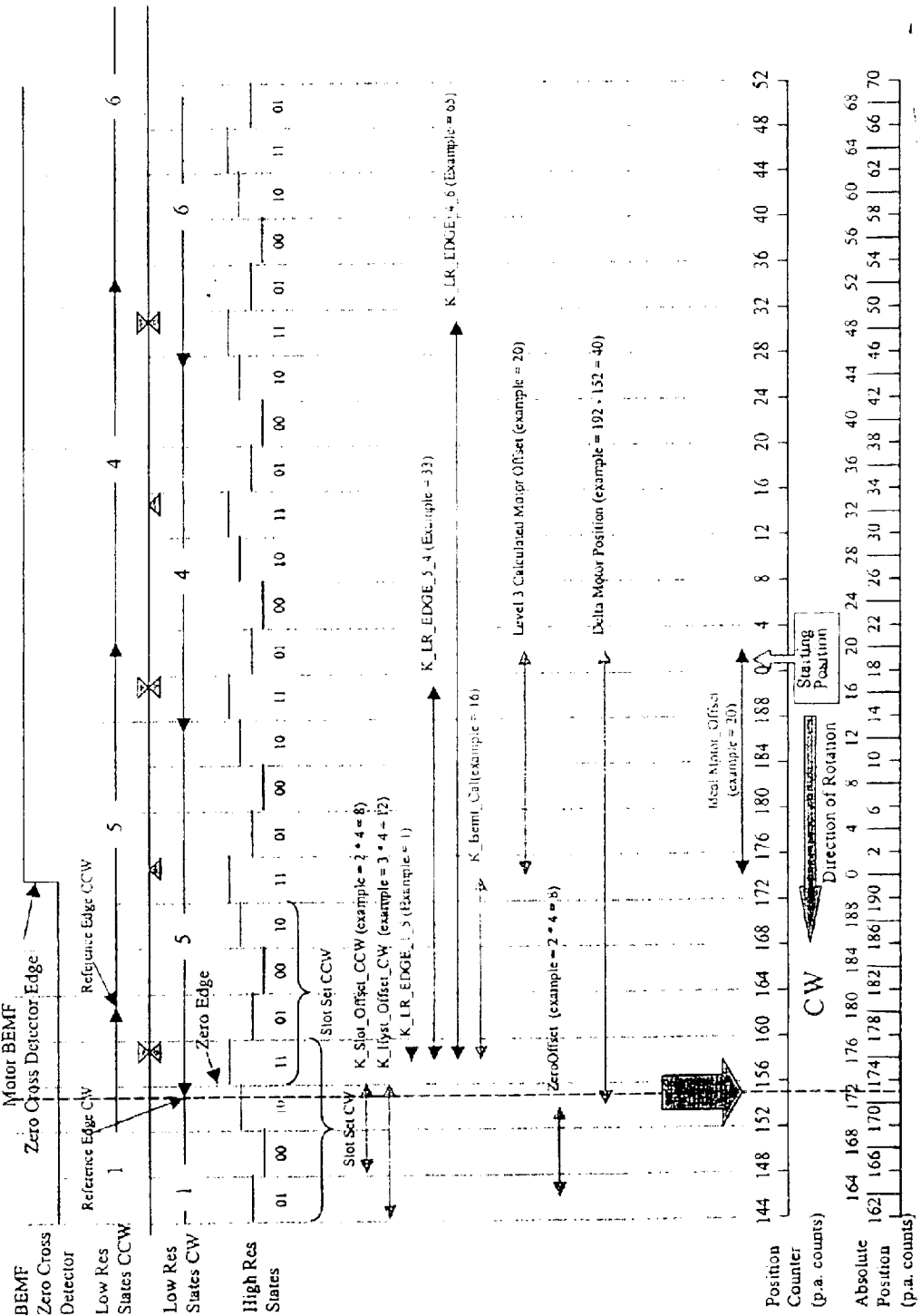
FIG. 23 depicts an illustrative Level 3 CW initialization example.

FIG. 23 depicts an exemplary Level 3 CW initialization. Using the algorithm given in the previous section and the following example values, the algorithm calculations are outlined below for the clockwise Level 3 example.

TABLE 8

Level 3 CW Example Values

| Variable | Value at Event |
|---|---|
| HR_CountCap | 152 counts$_{PA}$ |
| LR_State | 5 (101B) to 1 (001B) |
| Q$_1$_Captured, Q$_2$_Captured | 1, 0 |
| K_Bemf_Cal | 16 counts$_{PA}$ |
| K_LR_EDGE_1_5 | 1 counts$_{PA}$ |
| K_LR_EDGE_5_4 | 33 counts$_{PA}$ |
| K_LR_EDGE_4_6 | 65 counts$_{PA}$ |
| K_LR_EDGE_6_2 | 97 counts$_{PA}$ |
| K_LR_EDGE_2_3 | 129 counts$_{PA}$ |
| K_LR_EDGE_3_1 | 161 counts$_{PA}$ |
| K_Slot_Set_CCW | 8 counts$_{PA}$ |
| K_Hyst_Offset_CW | 12 counts$_{PA}$ |

Since the LR_State=1 the transition was clockwise:

locSlotOffset=4 locZeroOffset =

K_Hyst_Offset_CW − K_Slot_Set_CCW + locSlotOffset = 12 − 8 + 4 = 8

Roll Over/Roll Under Correction (0 to 15)

locZeroOffset=8

New_Motor_Offset =

(192 − HR_CountCap) + locZeroOffset − K_Bemf_Cal −

K_Hyst_Offset_CW = (192 − 152) + 8 − 16 − 12 = 20

Roll Over/Roll Under Correction (0 to 191)

New_Motor_Offset=20

Returning once again to FIG. 14, with a new motor offset computed the Level 3 initialization 500 is complete and the initialization algorithm 150 is ready to transition to a second walk process once again denoted Walk Motor_Offset 224. Once again, to facilitate correction of the value Motor_Offset, in an exemplary embodiment, an offset compensation algorithm is introduced denoted Walk Motor_Offset process 224 (FIG. 14). The Walk Motor_Offset 224 is similar to the process disclosed earlier whereby the existing value for motor offset Motor_Offset 152 (e.g., from the Level 1 initialization 300 or the Level 2 initialization 400) is migrated to achieve the newly determined value for the motor offset as a function (in this instance) of the Level 3 initialization 500. The function shown in FIG. 21 may be employed.

The Walk Motor_Offset 224 process continues for each cycle of controller 18 through the initialization algorithm 150 until the walk is complete as depicted at decision block 226. The completion of the walk is ascertained when the Motor_Offset 152 substantially attains or is within a selected threshold of the value of the New_Motor_Offset as computed by the Level 3 initialization 500.

The disclosed invention may be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What claimed is:

1. A method for calibrating and initializing position for a rotating device, the method comprising:
   establishing a sensor subsystem datum indicative of a measurement reference point for a sensor subsystem;
   obtaining a calibration value corresponding to a distance to a selected magnetic reference position for said rotating device, relative to said sensor subsystem datum;
   measuring a position and calculating a position delta relative to an initial reference;
   estimating an offset from said sensor subsystem datum to said initial reference;
   determining an absolute position estimate of said rotating device relative to said magnetic reference position; and
   wherein said absolute position estimate is responsive to said calibration value, said position delta, and said offset from said sensor subsystem datum to said initial reference.

2. The method of claim 1 wherein said establishing comprises selecting a reference position relative to which, any measurement in said sensor subsystem may be accomplished.

3. The method of claim 1 wherein said establishing comprises determining a selected point on a high-resolution position signal.

4. The method of claim 3 wherein said selected point corresponds with a high-resolution state of a plurality of high-resolution states responsive to said high-resolution position signal.

5. The method of claim 4 wherein said high-resolution position signal comprises a binary signal.

6. The method of claim 3 wherein said high-resolution position signal is one of a plurality of high resolution position signals comprising binary signals and wherein said plurality of high-resolution states is responsive to said plurality of high resolution position signals.

7. The method of claim 6 wherein said plurality of high-resolution position signals exhibit a deterministic phase shifted relation from which direction may be determined.

8. The method of claim 7 where wherein said plurality of high-resolution position signals are in quadrature.

9. The method of claim 4 wherein said establishing comprises determining a slot set comprising consecutive, unique, high-resolution states of said plurality of high-resolution states.

10. The method of claim 9 wherein said slot set comprises the largest set of consecutive, unique, high-resolution states.

11. The method of claim 9 wherein said slot set is selected such that a reference edge occurs within said slot set.

12. The method of claim 9 wherein said slot set includes a zero slot as a first slot of said slot set.

13. The method of claim 12 wherein said zero slot includes a zero edge and determining a position thereof corresponding to a leading edge of said zero slot.

14. The method of claim 6 wherein said plurality of high-resolution states is resultant from a high-resolution position signal, and another high-resolution position signal of said plurality of high resolution position signals combined to form a binary word indicative of said plurality of high-resolution states.

15. The method of claim 14 wherein said plurality of high resolution states comprises four states, and said binary word is a two bit binary word.

16. The method of claim 14 wherein said high-resolution position signal, and another high-resolution position signal, are in quadrature.

17. The method of claim 4 wherein said sensor subsystem datum comprises a selected state of said plurality of high-resolution states.

18. The method of claim 4 wherein said sensor subsystem datum comprises a selected transition to a selected state of said plurality of high-resolution states.

19. The method of claim 4 wherein said sensor subsystem datum corresponds to a best fit linear approximation of said high-resolution states for a revolution of said rotating device, configured to address bi-directional operation of said rotating device.

20. The method of claim 19 wherein said best fit linear approximation ideally intersects a zero midpoint.

21. The method of claim 19 wherein said zero midpoint corresponds to a midpoint of a zero slot and said zero slot is a first slot of a slot set.

22. The method of claim 21 wherein said zero slot includes a zero edge corresponding to a leading edge of said zero slot.

23. The method of claim 22 wherein said zero edge comprises a transition between a first high-resolution state and a second high-resolution state.

24. The method of claim 1 wherein said distance to a selected reference position is an angular displacement.

25. The method of claim 1 wherein said selected reference position is arbitrary.

26. The method of claim 1 wherein said selected reference position is a magnetic reference position corresponding to a positive going zero crossing of a back-emf for a selected line-to-line voltage in an electric machine.

27. The method of claim 26 wherein said selected line-to-line voltage is from phase A to phase B applied to said electric machine.

28. The method of claim 1 wherein said calibration value comprises a back-emf calibration a measured distance from said sensor subsystem reference to a positive going zero crossing of a back-emf for a selected line-to-line voltage of an electric machine.

29. The method of claim 1 wherein said measuring includes counting transitions through a plurality of high resolution states responsive to a high-resolution position signal wherein said counting yields a value corresponding to a position of said rotating device relative to said initial reference.

30. The method of claim 29 wherein said plurality of high-resolution states is responsive to a high-resolution position signal.

31. The method of claim 29 wherein said high-resolution position signal is one of a plurality of high-resolution position signals combined to form a binary word indicative of said plurality of high resolution states.

32. The method of claim 29 wherein said plurality of high-resolution states comprises four states, said plurality of high-resolution position signals comprises two high-resolution position signals, and said binary word is a two bit binary word.

33. The method of claim 29 wherein said counting includes setting a position counter responsive to said high-resolution position signal.

34. The method of claim 29 wherein said high-resolution position signal is one of a plurality of high-resolution position signals comprising high-resolution position signals in quadrature.

35. The method of claim 1 wherein said initial reference corresponds to an initial value of a position counter responsive to at least one high-resolution position signal at an arbitrary initial position of said rotating device.

36. The method of claim 35 wherein said initial value of a position counter is arbitrary.

37. The method of claim 1 wherein said initial reference is arbitrary.

38. The method of claim 1 wherein said estimating an offset includes ascertaining a position value corresponding to an estimated distance from said sensor subsystem datum to said initial reference.

39. The method of claim 38 wherein said position value is responsive to a selected location within a low-resolution state.

40. The method of claim 39 wherein said selected location is a midpoint of said low-resolution state.

41. The method of claim 40 wherein said midpoint comprises an average distance between a first transition to a first low-resolution state and a second transition to a second low-resolution state.

42. The method of claim 41 wherein said a first low-resolution state and said second low-resolution state are each one of a plurality of low-resolution states.

43. The method of claim 42 wherein said plurality of low-resolution states is generated in response to a binary combination of a plurality low-resolution position signals, said combination forming a binary word indicative of said plurality of low-resolution states.

44. The method of claim 43 wherein said low-resolution position signal is a binary signal.

45. The method of claim 43 wherein said low-resolution position signal is one of a plurality of low-resolution position signals transmitted from a plurality of low-resolution position sensors.

46. The method of claim 43 wherein said plurality low-resolution position signals comprises three low-resolution position signals, which are binary signals transmitted from three low-resolution position sensors configured to generate said three binary signals, each about 120 electrical degrees apart, respectively and said binary word comprises 3 bits.

47. The method of claim 43 wherein said a binary word and said plurality of low-resolution states is indicative of a position of said sensor subsystem.

48. The method of claim 47 wherein said binary word represents six low-resolution states corresponding to a selected range of absolute positions of said sensor subsystem.

49. The method of claim 48 wherein a reference edge corresponds to any transition between low-resolution state one of said plurality of low resolution states and low resolution state five of said plurality of low resolution states.

50. The method of claim 42 further including a first calibration value corresponding to said first transition indicative of a distance from said sensor subsystem datum to said first transition.

51. The method of claim 50 further including a second calibration value corresponding to said second transition indicative of a distance from said sensor subsystem datum to said second transition.

52. The method of claim 51 wherein said first calibration value and said second calibration value are each one of a plurality of calibration values.

53. The method of claim 52 wherein each calibration value of said plurality of calibration values is indicative of a distance from said sensor subsystem datum to a selected transition between two respective low resolution states of said plurality of low resolution states.

54. The method of claim 38 wherein said position value is responsive to a first transition between a first low-resolution state and a second low-resolution state.

55. The method of claim 54 wherein said a first low-resolution state and said second low-resolution state are each one of a plurality of low-resolution states.

56. The method of claim 55 wherein said plurality of low-resolution states is generated in response to a binary combination of a plurality low-resolution position signals, said combination forming a binary word indicative of said plurality of low-resolution states.

57. The method of claim 56 wherein said low-resolution position signal is a binary signal.

58. The method of claim 56 wherein said low-resolution position signal is one of a plurality of low-resolution position signals transmitted from a plurality of low-resolution position sensors.

59. The method of claim 56 wherein said plurality low-resolution position signals comprises three low-resolution position signals, which are binary signals transmitted from three low-resolution position sensors configured to generate said three binary signals, each about 120 electrical degrees apart, respectively and said binary word comprises 3 bits.

60. The method of claim 56 wherein said a binary word and said plurality of low-resolution states is indicative of a position of said sensor subsystem.

61. The method of claim 60 wherein said binary word represents six low-resolution states corresponding to a selected range of absolute positions of said sensor subsystem.

62. The method of claim 61 wherein a reference edge corresponds to any transition between low-resolution state one of said plurality of low resolution states and low resolution state five of said plurality of low resolution states.

63. The method of claim 55 further including a first calibration value corresponding to said first transition indicative of a distance from said sensor subsystem datum to said first transition.

64. The method of claim 63 wherein said first calibration value is one of a plurality of calibration values.

65. The method of claim 64 wherein each calibration value of said plurality of calibration values is indicative of a distance from said sensor subsystem datum to a selected transition between two respective low resolution states of said plurality of low resolution states.

66. The method of claim 38 wherein said position value corresponds to a selected high-resolution position responsive to a high-resolution position signal.

67. The method of claim 66 wherein said selected high resolution position corresponds with a selected position in a high-resolution state of a plurality of high-resolution states responsive to said high-resolution position signal.

68. The method of claim 67 wherein said high-resolution position signal comprises a binary signal.

69. The method of claim 66 wherein said high-resolution position signal is one of a plurality of high resolution position signals comprising binary signals and wherein said plurality of high-resolution states is responsive to said plurality of high resolution position signals.

70. The method of claim 69 wherein said plurality of high-resolution position signals exhibit a deterministic phase shifted relation from which direction may be determined.

71. The method of claim 70 where wherein said plurality of high-resolution position signals are in quadrature.

72. The method of claim 67 wherein said estimating comprises establishing a slot set comprising consecutive, unique, high-resolution states of said plurality of high-resolution states.

73. The method of claim 72 wherein said slot set comprises the largest set of consecutive, unique, high-resolution states.

74. The method of claim 72 wherein said slot set is selected such that a reference edge occurs within said slot set.

75. The method of claim 74 wherein said reference edge corresponds to any transition between a low-resolution state one and a low resolution state five.

76. The method of claim 72 wherein said slot set includes a zero slot as a first slot of said slot set.

77. The method of claim 76 wherein said zero slot includes a zero edge and determining a position thereof corresponding to a leading edge of said zero slot.

78. The method of claim 69 wherein said plurality of high-resolution states is resultant from said high-resolution position signal and another high-resolution position signal of said plurality of high resolution position signals combined to form a binary word indicative of said plurality of high-resolution states.

79. The method of claim 78 wherein said plurality of high resolution states comprises four states, and said binary word is a two bit binary word.

80. The method of claim 67 wherein said selected position corresponds to a best fit linear approximation through a zero slot, configured to address bi-directional operation of said rotating device.

81. The method of claim 80 wherein said selected position is ideally a zero midpoint.

82. The method of claim 81 wherein said zero midpoint corresponds to a midpoint of a zero slot of a selected slot set.

83. The method of claim 1 wherein said determining comprises a combination including said calibration value said delta position and said offset resultant from said estimating.

84. The method of claim 83 wherein said combination comprises a subtraction of said calibration value and said position delta from said offset.

85. The method of claim 83 wherein said calibration value corresponds to a back-emf calibration and a measured distance from said sensor subsystem reference to a positive going zero crossing of a back-emf for a selected line-to-line voltage of an electric machine.

86. The method of claim 83 wherein said delta position corresponds with a difference between a current value of a position counter and an initial value of said position counter.

87. The method of claim 86 wherein said delta position corresponds to a measured distance said electric machine has moved relative to said initial reference.

88. The method of claim 83 wherein said offset is the distance for said sensor subsystem datum to a midpoint of a low-resolution state.

89. The method of claim 88 wherein said midpoint of a low-resolution state is a calibration value.

90. The method of claim 88 wherein said midpoint is computed as an average mean between a plurality of low-resolution transitions.

91. The method of claim 90 wherein said plurality of low-resolution transitions correspond with a plurality of calibration values.

92. The method of claim 83 wherein said offset is the distance for said sensor subsystem reference to a selected transition between two low-resolution states.

93. The method of claim 92 wherein said selected transition is a calibration value.

94. The method of claim 92 wherein said selected transition is computed from selected low-resolution states of a plurality of low-resolution states.

95. The method of claim 94 wherein said plurality of low-resolution states correspond with a plurality of calibration values.

96. The method of claim 83 wherein said offset is a distance from said sensor subsystem datum to a best fit linear approximation of a plurality of high-resolution states over an entire revolution of said rotating device.

97. The method of claim 96 wherein said offset is a distance from said sensor subsystem datum to a midpoint of a selected high-resolution state denoted as a zero midpoint.

98. The method of claim 96 wherein said offset includes at least one of a zero offset and a hysteresis offset.

99. The method of claim 98 wherein said a zero offset comprises at least one of: a slot offset, a slot set calibration value, a hysteresis offset.

100. The method of claim 1 further including said determining an absolute position estimate further including an iterative walk function for transitioning said estimating from an existing value to a calculated value.

101. The method of claim 100 wherein said transitioning is adapted to avoid objectionable excursions between values of said estimating.

102. The method of claim 100 wherein said iterative walk has corrective steps that are based on at least one of time and position.

103. A system for calibrating and initializing an electronically commutated electric machine, the system comprising:
    an electric machine;
    a position sensor subsystem operatively connected to said electric machine configured to measure a position and transmit a position signal to a controller;
    an absolute position sensor operatively connected to said controller and transmitting a position signal indicative of an absolute position of said electric machine.
    a relative position sensor operatively connected to said controller and transmitting a position signal indicative of a position of said electric machine.
    wherein said controller executes a process implementing a method for calibrating and initializing position for said electric machine, the method comprising:

establishing a sensor subsystem datum indicative of a measurement reference point for a sensor subsystem;

obtaining a calibration value corresponding to a distance to a selected magnetic reference position for said rotating device, relative to said sensor subsystem datum;

measuring a position and calculating a position delta relative to an initial reference;

estimating an offset from said sensor subsystem datum to said initial reference;

determining an absolute position estimate of said electric machine relative to said magnetic reference position; and wherein said absolute position estimate is responsive to said calibration value, said position delta, and said offset from said sensor subsystem datum to said initial reference.

104. The system of claim 103 wherein said establishing comprises determining a selected point on a high-resolution position signal.

105. The system of claim 104 wherein said selected point corresponds with a high-resolution state of a plurality of high-resolution states responsive to said high-resolution position signal.

106. The system of claim 104 wherein said high-resolution position signal is one of a plurality of high resolution position signals comprising binary signals generated in response to the passing of a sense magnet and wherein said plurality of high-resolution states is responsive to said plurality of high resolution position signals.

107. The system of claim 106 wherein said plurality of high-resolution position signals exhibit a deterministic phase shifted relation from which direction may be determined.

108. The system of claim 107 where wherein said plurality of high-resolution position signals are in quadrature.

109. The system of claim 106 wherein said plurality of high-resolution states is resultant from a high-resolution position signal and another high-resolution position signal of said plurality of high resolution position signals combined to form a binary word indicative of said plurality of high-resolution states.

110. The system of claim 109 wherein said plurality of high resolution states comprises four states, and said binary word is a two bit binary word.

111. The system of claim 105 wherein said sensor subsystem datum comprises a selected state of said plurality of high-resolution states.

112. The system of claim 105 wherein said sensor subsystem datum comprises a selected transition to a selected state of said plurality of high-resolution states.

113. The system of claim 105 wherein said sensor subsystem datum corresponds to a best fit linear approximation of said high-resolution states for a revolution of said rotating device, configured to address bi-directional operation of said rotating device.

114. The system of claim 103 wherein said distance to a selected reference position is an angular displacement.

115. The system of claim 103 wherein said selected reference position is arbitrary.

116. The system of claim 103 wherein said selected reference position is a magnetic reference position corresponding to a positive going zero crossing of a back-emf for a selected line-to-line voltage in an electric machine.

117. The system of claim 103 wherein said measuring includes counting transitions through a plurality of high resolution states responsive to a high-resolution position signal wherein said counting yields a value corresponding to a position of said rotating device relative to said initial reference.

118. The system of claim 117 wherein said plurality of high-resolution states comprises four states, said plurality of high-resolution position signals comprises two high-resolution position signals.

119. The system of claim 103 wherein said initial reference corresponds to an initial value of a position counter responsive to at least one high-resolution position signal at an arbitrary initial position of said rotating device.

120. The system of claim 103 wherein said estimating an offset includes ascertaining a position value corresponding to an estimated distance from said sensor subsystem datum to said initial reference.

121. The system of claim 120 wherein said position value is responsive to a selected location within a low-resolution state.

122. The system of claim 121 wherein said selected location is a midpoint of said low-resolution state.

123. The system of claim 122 wherein said midpoint comprises an average distance between a first transition to a first low-resolution state and a second transition to a second low-resolution state.

124. The system of claim 120 wherein said position value is responsive to a first transition between a first low-resolution state and a second low-resolution state.

125. The system of claim 124 wherein said a first low-resolution state and said second low-resolution state are each one of a plurality of low-resolution states.

126. The system of claim 125 wherein said plurality of low-resolution states is generated in response to a binary combination of a plurality low-resolution position signals, said combination forming a binary word indicative of said plurality of low-resolution states.

127. The system of claim 126 wherein said plurality low-resolution position signals comprises three low-resolution position signals, which are binary signals transmitted from three low-resolution position sensors configured to generate said three binary signals, each about 120 electrical degrees apart, respectively and said binary word comprises 3 bits.

128. The system of claim 125 further including a first calibration value corresponding to said first transition indicative of a distance from said sensor subsystem datum to said first transition.

129. The system of claim 128 wherein said first calibration value is one of a plurality of calibration values.

130. The system of claim 129 wherein each calibration value of said plurality of calibration values is indicative of a distance from said sensor subsystem datum to a selected transition between two respective low resolution states of said plurality of low resolution states.

131. The system of claim 120 wherein said position value corresponds to a selected high-resolution position responsive to a high-resolution position signal.

132. The system of claim 131 wherein said selected high resolution position corresponds with a selected position in a high-resolution state of a plurality of high-resolution states responsive to said high-resolution position signal.

133. The system of claim 132 wherein said estimating comprises establishing a slot set comprising consecutive, unique, high-resolution states of said plurality of high-resolution states.

134. The system of claim 133 wherein said slot set is selected such that a reference edge occurs within said slot set.

135. The system of claim 134 wherein said reference egde corresponds to any transition between a low-resolution state one and a low resolution state five.

136. The system of claim 132 wherein said selected position corresponds to a best fit linear approximation through a zero slot, configured to address bi-directional operation of said rotating device.

137. The system of claim 136 wherein said selected position is ideally a zero midpoint.

138. The system of claim 137 wherein said zero midpoint corresponds to a midpoint of a zero slot of a selected slot set.

139. The system of claim 103 wherein said determining comprises a combination including said calibration value said delta position and said offset resultant from said estimating.

140. The system of claim 139 wherein said combination comprises a subtraction of said calibration value and said position delta from said offset.

141. The system of claim 139 wherein said calibration value corresponds to a back-emf calibration and a measured distance from said sensor subsystem reference to a positive going zero crossing of a back-emf for a selected line-to-line voltage of an electric machine.

142. The system of claim 139 wherein said delta position corresponds with a difference between a current value of a position counter and an initial value of said position counter.

143. The system of claim 142 wherein said delta position corresponds to a measured distance said electric machine has moved relative to said initial reference.

144. The system of claim 139 wherein said offset is the distance for said sensor subsystem datum to a midpoint of a low-resolution state.

145. The system of claim 139 wherein said offset is the distance for said sensor subsystem reference to a selected transition between two low-resolution states.

146. The system of claim 139 wherein said offset is a distance from said sensor subsystem datum to a best fit linear approximation of a plurality of high-resolution states over an entire revolution of said rotating device.

147. The system of claim 146 wherein said offset is a distance from said sensor subsystem datum to a midpoint of a selected high-resolution state denoted as a zero midpoint.

148. The system of claim 146 wherein said offset includes at least one of a zero offset and a hysteresis offset.

149. The system of claim 148 wherein said a zero offset comprises at least one of: a slot offset, a slot set calibration value, a hysteresis offset.

150. The system of claim 103 further including said determining an absolute position estimate further including an iterative walk function for transitioning said estimating from an existing value to a calculated value.

151. The system of claim 150 wherein said iterative walk has corrective steps that are based on at least one of time and position.

152. A storage medium, said storage medium including instructions for causing a controller to implement a method for calibrating and initializing position for a rotating device:

establishing a sensor subsystem datum indicative of a measurement reference point for a sensor subsystem;

obtaining a calibration value corresponding to a distance to a selected magnetic reference position for said rotating device, relative to said sensor subsystem datum;

measuring a position and calculating a position delta relative to an initial reference;

estimating an offset from said sensor subsystem datum to said initial reference;

determining an absolute position estimate of said rotating device relative to said magnetic reference position; and wherein said absolute position estimate is responsive to said calibration value, said position delta, and said offset from said sensor subsystem datum to said initial reference.

153. A computer data signal, said data signal comprising code configured to cause a controller to implement a method for determining a velocity of a rotating device, the method comprising:

establishing a sensor subsystem datum indicative of a measurement reference point for a sensor subsystem;

obtaining a calibration value corresponding to a distance to a selected magnetic reference position for said rotating device, relative to said sensor subsystem datum;

measuring a position and calculating a position delta relative to an initial reference;

estimating an offset from said sensor subsystem datum to said initial reference; determining an absolute position estimate of said rotating device relative to said magnetic reference position; and wherein said absolute position estimate is responsive to said calibration value, said position delta, and said offset from said sensor subsystem datum to said initial reference.

* * * * *